United States Patent
Kuang

(10) Patent No.: US 9,800,718 B2
(45) Date of Patent: Oct. 24, 2017

(54) METHOD FOR CONTROLLING WEARABLE ELECTRONIC DEVICES, CENTRAL APPARATUS, AND CENTRAL DEVICE

(71) Applicant: Huawei Technologies Co., Ltd., Shenzhen (CN)

(72) Inventor: Yunsheng Kuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/323,507

(22) PCT Filed: Jul. 14, 2014

(86) PCT No.: PCT/CN2014/082140
§ 371 (c)(1),
(2) Date: Jan. 3, 2017

(87) PCT Pub. No.: WO2016/008068
PCT Pub. Date: Jan. 21, 2016

(65) Prior Publication Data
US 2017/0163795 A1      Jun. 8, 2017

(51) Int. Cl.
*H04B 1/3827* (2015.01)
*H04M 1/725* (2006.01)
*G08C 17/02* (2006.01)

(52) U.S. Cl.
CPC ........ *H04M 1/72577* (2013.01); *G08C 17/02* (2013.01); *H04B 1/385* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2008/0220831 A1 | 9/2008 | Alameh et al. | |
| 2011/0018731 A1 | 1/2011 | Linsky et al. | |

(Continued)

FOREIGN PATENT DOCUMENTS

| | | |
|---|---|---|
| CN | 102938892 A | 2/2013 |
| CN | 103368617 A | 10/2013 |
| CN | 103458532 A | 12/2013 |
| CN | 103823393 A | 5/2014 |

OTHER PUBLICATIONS

Foreign Communication From a Counterpart Application, PCT Application PCT/CN2014/082140, International Search Report, dated Apr. 16, 2015, 4 pages.

(Continued)

*Primary Examiner* — Brian Zimmerman
*Assistant Examiner* — Cal Eustaquio
(74) *Attorney, Agent, or Firm* — Conley Rose, P.C.

(57) ABSTRACT

A method for controlling wearable electronic devices, a central apparatus, and a central device are provided, where the method includes after establishing communication connections to at least two wearable electronic devices, determining, by the central device, whether the at least two wearable electronic devices support a same function, and obtaining device information of the wearable electronic devices supporting the same function when the at least two wearable electronic devices support a same function, and determining, according to the device information, at least one of the wearable electronic devices that support the same function as a target wearable electronic device, and disabling a service that is corresponding to the same function and that is on the target wearable electronic device.

13 Claims, 6 Drawing Sheets

(52) U.S. Cl.
CPC ...... *H04M 1/7253* (2013.01); *G08C 2201/93* (2013.01); *H04B 2001/3861* (2013.01)

(56) References Cited

U.S. PATENT DOCUMENTS

| | | |
|---|---|---|
| 2013/0217978 A1 | 8/2013 | Ma |
| 2014/0106677 A1 | 4/2014 | Altman |
| 2016/0227600 A1* | 8/2016 | Shedletsky ......... H04M 1/7253 |

OTHER PUBLICATIONS

Foreign Communication From a Counterpart Application, PCT Application PCT/CN2014/082140, International Search Report, English translation, dated Apr. 16, 2015, 2 pages.
Foreign Communication From a Counterpart Application, PCT Application PCT/CN2014/082140, Written Opinion, dated Apr. 16, 2015, 3 pages.
Foreign Communication From a Counterpart Application; PCT Application PCT/CN2014/082140; Written Opinion; English translation, dated Apr. 16, 2015, 6 pages.
Machine Translation and Abstract of Chinese Publication No. CN102938892, Feb. 20, 2013, 7 pages.
Foreign Communication From a Counterpart Application, European Application No. 14897499.1, Extended European Search Report dated Apr. 18, 2017, 5 pages.
Foreign Communication From a Counterpart Application, Chinese Application No. 201480059684.0, Chinese Office Action dated Apr. 1, 2017, 5 pages.

* cited by examiner

METHOD FOR CONTROLLING WEARABLE ELECTRONIC DEVICES, CENTRAL APPARATUS, AND CENTRAL DEVICE

CROSS-REFERENCE TO RELATED APPLICATIONS

This application is a national stage of International Application No. PCT/CN2014/082140, filed on Jul. 14, 2014, which is hereby incorporated by reference in its entirety.

TECHNICAL FIELD

Embodiments of the present disclosure relate to technologies in the communications field, and in particular, to a method for controlling wearable electronic devices, a central apparatus, and a central device.

BACKGROUND

As Internet technologies become more mature and hardware develops toward miniaturization, a large quantity of wearable electronic devices emerge one after another. In the future, integrating multiple wearable electronic devices on the body of one person will become a universal phenomenon.

At present, many wearable electronic devices on the market usually have mutually duplicate functions. For example, some smart watches and smart glasses have a function of reminding a missed call and an unread message. Some smart bands, smart sports shoes, and weighing scales are all equipped with a sensor for measuring a heart rate. The sensor is used to measure and report real-time heart rate data, and monitor a human body health status and a exercise energy expenditure status.

In the prior art, configuration management of interaction between a single wearable electronic device and a central device is implemented. However, when multiple wearable electronic devices are connected to the central device at the same time, not only device functions are wasted, but also electrical energy of the wearable electronic devices is unnecessarily consumed, which is unfavorable for saving energy of the wearable electronic devices.

SUMMARY

Embodiments of the present disclosure provide a method for controlling wearable electronic devices, a central apparatus, and a central device, to enable the central device to perform function scheduling on at least two wearable electronic devices that support a same service, which helps reduce power consumption of the wearable electronic devices.

According to a first aspect, an embodiment of the present disclosure provides a method for controlling wearable electronic devices, where the method is executed by a central device and includes determining whether at least two wearable electronic devices support a same function after establishing communication connections to the at least two wearable electronic devices, and obtaining device information of the wearable electronic devices that support the same function if the at least two wearable electronic devices support a same function, and determining, according to the device information, at least one of the wearable electronic devices that support the same function as a target wearable electronic device, and disabling a service that is corresponding to the same function and that is on the target wearable electronic device.

According to an implementation manner of the first aspect, in a first possible implementation manner of the first aspect, determining whether the at least two wearable electronic devices support a same function includes obtaining service lists of the at least two wearable electronic devices, determining, according to the service lists, whether the at least two wearable electronic devices support a same service, obtaining characteristic lists that are of the wearable electronic devices that support the same service and that are corresponding to the same service if the at least two wearable electronic devices support a same service, determining, according to the characteristic lists, whether characteristics of the same services supported by the wearable electronic devices that support the same service are the same, and determining that the wearable electronic devices that support the same service support the same function if the characteristics are the same.

According to the first aspect or the first possible implementation manner of the first aspect, in a second possible implementation manner of the first aspect, the device information includes only a device identification, and determining, according to the device information, at least one of the wearable electronic devices that support the same function as a target wearable electronic device includes setting a carry-on wearable electronic device as the target wearable electronic device when the wearable electronic devices that support the same function include the carry-on wearable electronic device and a non-carry-on wearable electronic device according to device identifications.

According to the first aspect or the first possible implementation manner of the first aspect, in a third possible implementation manner of the first aspect, the device information includes a device identification and a current battery, and further includes at least one of a power consumption speed or a sensor model, and determining, according to the device information, at least one of the wearable electronic devices that support the same function as a target wearable electronic device includes obtaining, according to characteristic values corresponding to the device information of each of the wearable electronic devices that support the same function and according to a weight of each type of device information, a weighted characteristic value corresponding to each of the wearable electronic devices that support the same function, and determining, according to the weighted characteristic value corresponding to each of the wearable electronic devices that support the same function, the target wearable electronic device from the wearable electronic devices that support the same function.

According to the first aspect or the first possible implementation manner of the first aspect, in a fourth possible implementation manner of the first aspect, the device information includes a device identification, a current battery, and a power consumption speed, and determining, according to the device information, at least one of the wearable electronic devices that support the same function as a target wearable electronic device includes setting a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all noncarry-on wearable electronic devices, obtaining, according to the current battery and the power consumption speed that are of each of the wearable devices that support the same function, a correspondence between the current battery and a characteristic value, a correspondence between the power consumption speed and a characteristic value, a weight of the power consumption speed, and a weight of the current battery, a weighted characteristic value corresponding to each of the wearable electronic devices that support the same function, and determining, according to the weighted characteristic value corresponding to each of the wearable electronic devices that support the same function, the target wearable electronic device from the wearable electronic devices that support the same function, where the weight of the power consumption speed is higher than the weight of the current battery when the current batteries of the wearable electronic devices that support the same function are all greater than a first threshold, or the weight of the current battery is higher than the power consumption speed when at least one of the current batteries of the wearable electronic devices that support the same function is less than a first threshold.

According to the first aspect or the first possible implementation manner of the first aspect, in a fifth possible implementation manner of the first aspect, the device information includes a device identification, a current battery, and a sensor model, and determining, according to the device information, at least one of the wearable electronic devices that support the same function as a target wearable electronic device includes setting the carry-on wearable electronic device as the target wearable electronic device if it is determined, according to device identifications, that the wearable electronic devices that support the same function include a carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtaining, according to the current battery and the sensor model that are of each of the wearable devices that support the same function, a correspondence between the current battery and a characteristic value, a correspondence between the sensor model and a characteristic value, a weight of the power consumption speed, and a weight of the sensor model, a weighted characteristic value corresponding to each of the wearable electronic devices that support the same function, and determining, according to the weighted characteristic value corresponding to each of the wearable electronic devices that support the same function, the target wearable electronic device from the wearable electronic devices that support the same function, where the weight of the sensor model is higher than the weight of the current battery when the current batteries of the wearable electronic devices that support the same function are all greater than a second threshold, or the weight of the current battery is higher than the weight of the sensor when at least one of the current batteries of the wearable electronic devices that support the same function is less than a second threshold.

According to the first aspect or the first possible implementation manner of the first aspect, in a sixth possible implementation manner of the first aspect, the device information includes a device identification, a current battery, a power consumption speed, and a sensor model, and the determining, according to the device information, at least one of the wearable electronic devices that support the same function as a target wearable electronic device includes setting the carry-on wearable electronic device as the target wearable electronic device if it is determined, according to device identifications, that the wearable electronic devices that support the same function include a carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtaining, according to the current battery, the power consumption speed, and the sensor model that are of each of the wearable devices that support the same function, a correspondence between the current battery and a characteristic value, a correspondence between the power consumption speed and a characteristic value, a correspondence between the sensor model and a characteristic value, a weight of the power consumption speed, a weight of the current battery, and a weight of the sensor model, a weighted characteristic value corresponding to each of the wearable electronic devices that support the same function, and determining, according to the weighted characteristic value corresponding to each of the wearable electronic devices that support the same function, the target wearable electronic device from the wearable electronic devices that support the same function, where the weight of the sensor model is higher than both the weight of the current battery and the weight of the power consumption speed when the current batteries of the wearable electronic devices that support the same function are all greater than a third threshold, or the weight of the power consumption speed is higher than both the weight of the current battery and the weight of the sensor model when the current batteries of the wearable electronic devices that support the same function are all greater than a fourth threshold and at least one of the current batteries is less than the third threshold, and the fourth threshold is less than the third threshold, or the weight of the current battery is higher than both the weight of the power consumption speed and the weight of the sensor model when at least one of the current batteries of the wearable electronic devices that support the same function is less than the fourth threshold.

According to a second aspect, an embodiment of the present disclosure provides a central apparatus, where the central apparatus includes a connection module, a determining module, and a processing module, where the connection module is configured to establish communication connections to at least two wearable electronic devices. The determining module is configured to determine whether the at least two wearable electronic devices support a same function, and the processing module is configured to obtain device information of the wearable electronic devices that support the same function, determine, according to the device information, at least one of the wearable electronic devices that support the same function as a target wearable electronic device, and disable a service that is corresponding to the same function and that is on the target wearable electronic device if the at least two wearable electronic devices support a same function.

According to an implementation manner of the second aspect, in a first possible implementation manner of the second aspect, the determining module includes a first determining unit configured to obtain service lists of the at least two wearable electronic devices, and determine, according to the service lists, whether the at least two wearable electronic devices support a same service, a second determining unit configured to obtain characteristic lists that are of the wearable electronic devices that support the same service and that are corresponding to the same service, and determine, according to the characteristic lists, whether characteristics of the same services supported by the wearable electronic devices that support the same service are the same if the at least two wearable electronic devices support a same service, and a third determining unit configured to determine that the wearable electronic devices that support the same service support the same function if the characteristics are the same.

According to the second aspect or the first possible implementation manner of the second aspect, in a second possible implementation manner of the second aspect, the device information includes only a device identification, and the processing module is configured to set a carry-on wearable electronic device as the target wearable electronic device if it is determined, according to device identifications, that the wearable electronic devices that support the same function include the carry-on wearable electronic device and a non-carry-on wearable electronic device.

According to the second aspect or the first possible implementation manner of the second aspect, in a third possible implementation manner of the second aspect, the device information includes a device identification and a current battery, and further includes at least one of a power consumption speed or a sensor model, and the processing module is configured to obtain, according to characteristic values corresponding to the device information of each of the wearable electronic devices that support the same function and according to a weight of each type of device information, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function.

According to the second aspect or the first possible implementation manner of the second aspect, in a fourth possible implementation manner of the second aspect, the device information includes a device identification, a current battery, and a power consumption speed, and the processing module is configured to set a carry-on wearable electronic device as the target wearable electronic device if it is determined, according to device identifications, that the wearable electronic devices that support the same function include the carry-on wearable electronic device and a non-carry-on wearable electronic devices, or if it is determined, according to device identifications, that the wearable electronic devices that support the same function are all carry-on wearable electronic devices or are all non-carry-on wearable electronic devices, obtain, according to the current battery and the power consumption speed that are of each of the wearable devices that support the same function, a correspondence between the current battery and a characteristic value, a correspondence between the power consumption speed and a characteristic value, a weight of the power consumption speed, and a weight of the current battery, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the power consumption speed is higher than the weight of the current battery when the current batteries of the wearable electronic devices that support the same function are all greater than a first threshold, or the weight of the current battery is higher than the power consumption speed when at least one of the current batteries of the wearable electronic devices that support the same function is less than a first threshold.

According to the second aspect or the first possible implementation manner of the second aspect, in a fifth possible implementation manner of the second aspect, the device information includes a device identification, a current battery, and a sensor model, and the processing module is configured to set a carry-on wearable electronic device as the target wearable electronic device if it is determined, according to device identifications, that the wearable electronic devices that support the same function include a carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery and the sensor model that are of each of the wearable devices that support the same function, a correspondence between the current battery and a characteristic value, a correspondence between the sensor model and a characteristic value, a weight of the power consumption speed, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than the weight of the current battery when the current batteries of the wearable electronic devices that support the same function are all greater than a second threshold, or the weight of the current battery is higher than the weight of the sensor when at least one of the current batteries of the wearable electronic devices that support the same function is less than a second threshold.

According to the second aspect or the first possible implementation manner of the second aspect, in a sixth possible implementation manner of the second aspect, the device information includes a device identification, a current battery, a power consumption speed, and a sensor model, and the processing module is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery, the power consumption speed, and the sensor model that are of each of the wearable devices that support the same function, a correspondence between the current battery and a characteristic value, a correspondence between the power consumption speed and a characteristic value, a correspondence between the sensor model and a characteristic value, a weight of the power consumption speed, a weight of the current battery, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than both the weight of the current battery and the weight of the power consumption speed when the current batteries of the wearable electronic devices that support the same function are all greater than a third threshold, or the weight of the power consumption speed is higher than both the weight of the current battery and the weight of the sensor model when the current batteries of the wearable electronic devices that support the same function are all greater than a fourth threshold and at least one of the current batteries is less than the third threshold, and the fourth threshold is less than the third threshold, or the weight of the current battery is higher than both the weight of the power consumption speed and the weight of the sensor model when at least one of the current batteries of the wearable electronic devices that support the same function is less than the fourth threshold.

According to a third aspect, an embodiment of the present disclosure provides a central device, where the central device includes a transceiver and a processor, where the transceiver is configured to establish communication connections to at least two wearable electronic devices. The processor is configured to determine whether the at least two wearable electronic devices support a same function after the transceiver establishes the communication connections, obtain device information of the wearable electronic devices that support the same function if the at least two wearable electronic devices support a same function, and determine, according to the device information, at least one of the wearable electronic devices that support the same function as a target wearable electronic device, and the transceiver is further configured to send a disable instruction to the target wearable electronic device, to disable a service that is corresponding to the same function and that is on the target wearable electronic device.

According to an implementation manner of the third aspect, in a first possible implementation manner of the third aspect, the processor is further configured to obtain service lists supported by the at least two wearable electronic devices, and determine, according to the service lists, whether the at least two wearable electronic devices support a same service, obtain characteristic lists that are of the wearable electronic devices that support the same service and that are corresponding to the same service if the at least two wearable electronic devices support a same service, and determine, according to the characteristic lists, whether characteristics of the same services supported by the wearable electronic devices that support the same service are the same, and determine that the wearable electronic devices that support the same service support the same function if the characteristics are the same.

According to the third aspect or the first possible implementation manner of the third aspect, in a second possible implementation manner of the third aspect, the device information includes only a device identification, and the processor is configured to set a carry-on wearable electronic device as the target wearable electronic device if it is determined, according to device identifications, that the wearable electronic devices that support the same function include the carry-on wearable electronic device and a non-carry-on wearable electronic device.

According to the third aspect or the first possible implementation manner of the third aspect, in a third possible implementation manner of the third aspect, the device information includes a device identification and a current battery, and further includes at least one of a power consumption speed or a sensor model, and the processor is configured to obtain, according to characteristic values corresponding to the device information of each of the wearable electronic devices that support the same function and according to a weight of each type of device information, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function.

According to the third aspect or the first possible implementation manner of the third aspect, in a fourth possible implementation manner of the third aspect, the device information includes a device identification, a current battery, and a power consumption speed, and the processor is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery and the power consumption speed that are of each of the wearable devices that support the same function, a correspondence between the current battery and a characteristic value, a correspondence between the power consumption speed and a characteristic value, a weight of the power consumption speed, and a weight of the current battery, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the power consumption speed is higher than the weight of the current battery when the current batteries of the wearable electronic devices that support the same function are all greater than a first threshold, or the weight of the current battery is higher than the power consumption speed when at least one of the current batteries of the wearable electronic devices that support the same function is less than a first threshold.

According to the third aspect or the first possible implementation manner of the third aspect, in a fifth possible implementation manner of the third aspect, the device information includes a device identification, a current battery, and a sensor model, and the processor is configured to set a carry-on wearable electronic device as the target wearable electronic device if it is determined, according to device identifications, that the wearable electronic devices that support the same function include a carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery and the sensor model that are of each of the wearable devices that support the same function, a correspondence between the current battery and a characteristic value, a correspondence between the sensor model and a characteristic value, a weight of the power consumption speed, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than the weight of the current battery when the current batteries of the wearable electronic devices that support the same function are all greater than a second threshold, or the weight of the current battery is higher than the weight of the sensor when at least one of the current batteries of the wearable electronic devices that support the same function is less than a second threshold.

According to the third aspect or the first possible implementation manner of the third aspect, in a sixth possible implementation manner of the third aspect, the device information includes a device identification, a current battery, a power consumption speed, and a sensor model, and the processor is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery, the power consumption speed, and the sensor model that are of each of the wearable devices that support the same function, a correspondence between the current battery and a characteristic value, a correspondence between the power consumption speed and a characteristic value, a correspondence between the sensor model and a characteristic value, a weight of the power consumption speed, a weight of the current battery, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than both the weight of the current battery and the weight of the power consumption speed when the current batteries of the wearable electronic devices that support the same function are all greater than a third threshold, or the weight of the power consumption speed is higher than both the weight of the current battery and the weight of the sensor model when the current batteries of the wearable electronic devices that support the same function are all greater than a fourth threshold and at least one of the current batteries is less than the third threshold, and the fourth threshold is less than the third threshold, or the weight of the current battery is higher than both the weight of the power consumption speed and the weight of the sensor model when at least one of the current batteries of the wearable electronic devices that support the same function is less than the fourth threshold.

According to the method for controlling wearable electronic devices, the central apparatus, and the central device provided in the embodiments of the present disclosure, the central device separately establishes a communication connection to at least two wearable electronic devices, for exchanging data. Then, the central device determines whether the at least two wearable electronic devices support a same function, and the central device obtains device information of the wearable electronic devices that support the same function if it is determined that the at least two wearable electronic devices support a same function, and the central device determines, according to the obtained device information and according to the device information of the wearable electronic devices that support the same function, at least one of the wearable electronic devices that support the same function as a target wearable electronic device. Finally, the central device disables a service that is corresponding to the same function and that is on the target wearable electronic device. In this way, the central device is enabled to perform, on the at least two wearable electronic devices, scheduling and configuration management of the service corresponding to the supported same function, which helps reduce power consumption of the wearable electronic devices.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
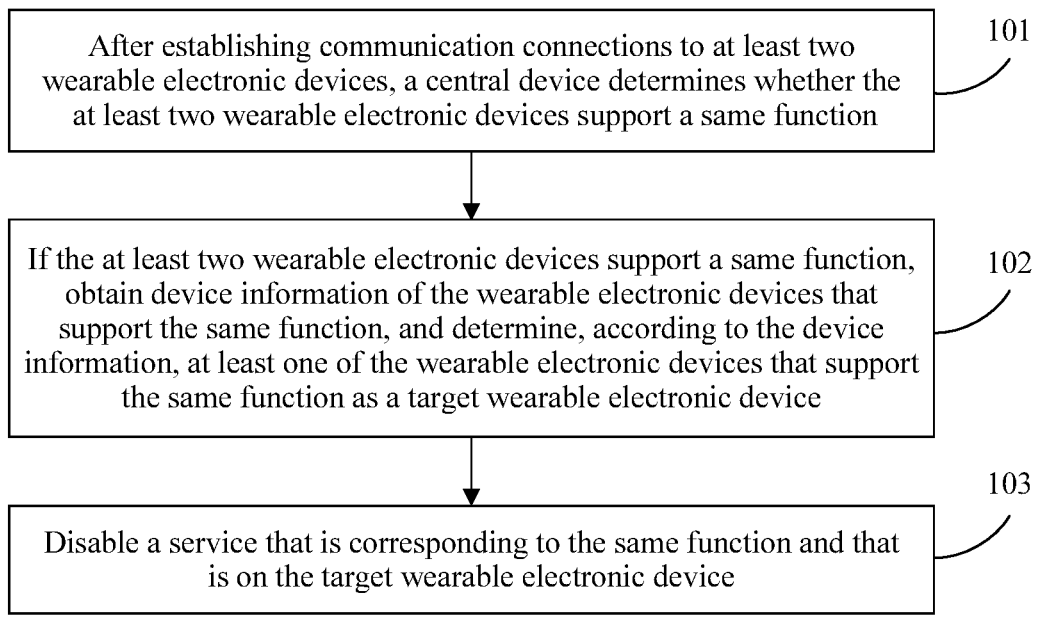
FIG. 1 is a flowchart of Embodiment 1 of a method for controlling wearable electronic devices according to the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

The following describes terms used in the embodiment of the present disclosure.

A central device may be a mobile electronic device that has a relatively high intelligence level and that integrates multiple communications functions, which includes a smartphone, a tablet computer, a personal digital assistant (PDA), and the like. The central device may support multiple wireless access manners, including BLUETOOTH. For example, in terms of the BLUETOOTH access manner, the central device supports a "dual-mode" mode, that is, supports conventional BLUETOOTH access and BLUETOOTH low energy access. Conventional BLUETOOTH has a relatively high transmission rate but also has relatively high power consumption, and is generally used to transmit a voice signal. BLUETOOTH low energy access has low power consumption but has a low transmission rate, and is generally used to transmit a low-bandwidth data signal. The central device may switch between conventional BLUETOOTH access and BLUETOOTH low energy access according to a characteristic of transmitted and received BLUETOOTH data. All common wearable electronic devices support a BLUETOOTH access manner for exchanging data, and some wearable electronic devices also support another wireless data access manner. According to functions of specific wearable electronic devices, some wearable electronic devices support a "single-mode" mode, that is, support only BLUETOOTH low energy access, and some wearable electronic devices also support the "dual-mode" mode, that is, support conventional BLUETOOTH access and BLUETOOTH low energy access.

Wearable electronic devices may be classified into two categories, carry-on wearable electronic devices and non-carry-on wearable electronic devices. A carry-on wearable electronic device refers to a wearable electronic device that has a relatively small size and can be worn on the body of a user for a long time and can operate. For example, a smart watch, a smart band, smart glasses, a smart accessory, smart sports shoes, a smart suspender, and smart clothes all belong to carry-on wearable electronic devices. In terms of a function executed by a wearable electronic device of this category, one type of wearable electronic device, such as smart glasses or a smart watch, used as an auxiliary part of a smartphone can execute some functions of the smartphone, for example, making or answering a call, receiving an SMS message, or taking a photo/recording a video, and a wearable electronic device having this type of function generally has a relatively high intelligence level. Another type of wearable electronic device, such as a smart band, a smart suspender, and smart sports shoes, is generally equipped with various types of sensors, which are used to measure physiological exercise indicators of a user such as a heart rate, blood pressure, a walking speed, or a step count, and generally has functions such as exercise monitoring, health monitoring, and sleep quality monitoring. A wearable electronic device having this type of function needs to monitor, instead of simply measuring, various indicators, and therefore, needs to be worn for a long time, or even worn on the body of a user 24 hours a day.

A non-carry-on wearable electronic device refers to a wearable electronic device that has a relatively large size and that cannot be or does not need to be worn on the body of a user for a long time and needs to be worn on the body of the user or come in contact with the body of the user only when required, to complete a corresponding function, for example, a smart sphygmomanometer, a smart glucometer, or a smart weighing scale. A non-carry-on wearable electronic device is often a medical treatment-related or health-related wearable electronic device, which uses a sensor that often has higher precision and a better function than those of a sensor of a carry-on wearable electronic device supporting a like function, and generally has no requirement with respect to power consumption or has a very low requirement with respect to power consumption.

A same function refers to a set of functions that can be implemented by at least two wearable electronic devices and that achieve a same effect. The function refers to a set of efficacies that can be implemented by the wearable electronic devices and that can achieve a specific effect. For example, heart rate measurement (HRM), blood pressure measurement, proximity sensing, and alarm notification are all referred to as a function. Implementation of each function needs to use a corresponding service as a support. One wearable electronic device may support one or more functions. A same function supported by at least two wearable electronic devices can be obtained by obtaining an intersection set of functions supported by the at least two wearable electronic devices.

A service of a wearable electronic device refers to program code configured for the wearable electronic device in order to implement a certain function, and may be implemented by software. For example, a heart rate service (HRS) is configured for a wearable electronic device having a HRM function. One or more services may be configured for one wearable electronic device, and a service of a wearable electronic device may be configured before the device leaves factory, or may be personally configured by a user after the device leaves factory. Each wearable electronic device saves a service list, which records a service supported by the wearable electronic device.

In terms of a characteristic corresponding to a service of a wearable electronic device, each service supported by the wearable electronic device consists of a series of characteristics, which are used to define function characteristics included in the service. For example, an HRS includes the following characteristics a HRM value, used to represent an actual numerical value obtained through HRM, a body sensor location, used to represent a location, of a sensor for measuring a heart rate, on a human body, and a heart rate control point, used to control a write operation of an HRS service client. Characteristics included in some services are the same, and a function implemented by this type of services is relatively simple. Characteristics included in some other services may be different and implement different services. A function implemented by services can be proved to be the same only when both the corresponding services and included characteristics are the same.

That characteristics corresponding to services are the same means that characteristics included in services supported by wearable electronic devices are the same.

A meaning of a target wearable electronic device and a quantity of target wearable electronic devices are as follows. A target wearable electronic device refers to a determined wearable electronic device, of at least two wearable electronic devices that support a same function, on which a service corresponding to the same function is disabled. Generally, assuming that a quantity of wearable electronic devices that support a function is N (N≥2), the service is reserved on only one wearable electronic device, and the service is disabled on the remaining N−1 devices, that is, a quantity of determined target wearable electronic devices is N−1. Certainly, alternatively, a quantity of target wearable electronic devices may be less than N−1, which is not limited in the embodiments of the present disclosure.

Device information refers to information such as a device identification, a sensor model, a current battery, and a power consumption speed, of a wearable electronic device.

A device identification is used to represent a product form of a wearable electronic device. A device identification may be expressed as a type of a wearable electronic device, for example, "watch," "band," "glasses," or "accessory," or may be expressed as a device name of a wearable electronic device, for example, GOOGLE GLASS, SAMSUNG Smart Watch, or APPLE WATCH. The device name may usually reflect a device type of the wearable electronic device. Device identification information is usually included in a "Device Identification" field.

Sensor model: A sensor model identifies a model of a sensor equipped in a wearable electronic device. The sensor model is generally included in a firmware version "Firmware Revision String" field. Generally, a wearable electronic device is equipped with one or more sensors or may be not equipped with a sensor according to a restriction of a device function of the wearable electronic device. Generally, different sensors are corresponding to different services and execute different functions. For example, two services, HRM and step counting, are completed by different sensors. In some cases, alternatively, a same service may be completed without using a sensor. Therefore, for at least two wearable electronic devices executing a same service, not all the wearable electronic devices have a corresponding sensor.

Current battery: A current battery refers to a ratio of a remaining battery to a total battery of a wearable electronic device when the battery is fully charged, and is generally represented by a percentage. The current battery is included in a "Battery Level" field. For example, when a numerical value in the "Battery Level" field is 78%, it represents that the current battery is 78% of the total battery when the battery is fully charged.

Power consumption speed: A power consumption speed represents a degree by which a wearable electronic device consumes power in a unit time in a working state. The power consumption speed is not obtained by reading a certain characteristic value, but the power consumption speed of the wearable electronic device is deduced by periodically reading a "Battery Level" characteristic value at a specific time interval. The power consumption speed may be represented by a value by which a current battery is reduced within a unit time when the wearable electronic device is in a working state. For example, within a specific time (for example, 100 seconds(s)), if a numerical value of the current battery "Battery Level" field decreases by 2%, it may be determined that a representative value of a power consumption speed of the wearable electronic device is 2. Certainly, a degree at which a current battery is reduced is not always the same in different time periods, and an average value of representative values of power consumption speeds in different time periods may be calculated, to obtain a more accurate representative value of a power consumption speed. In addition, besides using a numeral to represent a power consumption speed, several levels may be defined for a power consumption speed, for example, three levels, "high," "mediate," and "low." Specific level definition may be set according to a requirement, which is not limited in the embodiments of the present disclosure.

A characteristic value of device information refers to a quantized numerical value corresponding to a characteristic in the device information, and is used to represent performance of the characteristic. It should be noted that, there may be one correspondence between device information and a characteristic value, and according to the correspondence and the device information, a corresponding characteristic value of each piece of device information may be found, or it may be that corresponding characteristic values of only some device information are found.

For a "device identification" characteristic, different characteristic values are set to differentiate between a carry-on wearable electronic device and a non-carry-on wearable electronic device. For example, the characteristic value of the "device identification" characteristic of the carry-on wearable electronic device may be set to 1, and the characteristic value of the "device identification" characteristic of the non-carry-on wearable electronic device may be set to 2, or may be set to another value.

For a "sensor model" characteristic, different characteristic values are set to represent performance, reliability, and sensitivity of a sensor. For example, a characteristic value of the "sensor model" characteristic is set to a larger value when the sensor has better performance. Using sensors for measuring a heart rate as an example, a model of a heart rate sensor of a wearable electronic device A is "XDS019," a model of a heart rate sensor of a wearable electronic device B is "HK2000H," and performance (such as sensitivity or precision) of sensor "HK2000H" is better than that of sensor "XDS019." Therefore, a characteristic value of the "sensor model" of the wearable electronic device A may be set to 0.5, and a characteristic value of the "sensor model" of the wearable electronic device B may be set to 0.8. To select a sensor with better sensor performance, a wearable electronic device with a larger weighted characteristic value may be finally selected. Otherwise, a characteristic value of a "sensor model" with better performance may also be set to a smaller value if a wearable electronic device with a smaller weighted characteristic value is selected.

For a "current battery" characteristic, a set characteristic value of a current battery is generally in positive correlation to a numerical value of a "Battery Level" field, that is, a larger numerical value of the "Battery Level" field indicates a larger characteristic value of the current battery. However, alternatively, a characteristic value of a current battery may be set to be in inverse correlation to a numerical value of a "Battery Level" field, that is, a larger numerical value of the "Battery Level" field indicates a smaller characteristic value of the current battery. The foregoing "correlation" may be a linear relationship, or may be a non-linear relationship. For example, a characteristic value of a current battery of the wearable electronic device may be set to 0.78 when a numerical value of a "Battery Level" field of a wearable electronic device is 78%, or may be set to another value according to a criterion for selecting a weighted characteristic value.

For a "power consumption speed" characteristic, a set characteristic value of a power consumption speed is in inverse correlation to a representative value of the power consumption speed, that is, a larger representative value of the power consumption speed indicates a smaller characteristic value of the power consumption speed. However, alternatively, a characteristic value of a power consumption speed may be set to be in positive correlation to a representative value of the power consumption speed, that is, a larger representative value of the power consumption speed indicates a larger characteristic value of the power consumption speed. The foregoing "correlation" may be a linear relationship, or may be a non-linear relationship. For example, the characteristic value of the power consumption speed may be set to 0.3 when the representative value of the power consumption speed is "high," or the characteristic value of the power consumption speed may be set to 0.5 when the representative value of the power consumption speed is "low," or may be set to another value according to a criterion for selecting a weighted characteristic value.

A weight of device information refers to a weight assigned to each characteristic during a determining process. A greater weight of a certain device information characteristic indicates that the characteristic has a greater weight in affecting a result of determining in a determining process. For example, if device information of a wearable electronic device includes a sensor model, a current battery, and a power consumption speed, where a weight of a sensor is greater than a weight of the current battery, and the weight of the current battery is greater than a weight of the power consumption speed, the sensor model has greatest impact in finally selecting a wearable electronic device as a target wearable electronic device.

A weighted characteristic value refers to a result obtained, in a determining process, by calculating a sum of results obtained by multiplying a characteristic value of each characteristic in device information by a weight corresponding to the characteristic. The weighted characteristic value is an ultimate basis for a central device to determine a target wearable electronic device. For example, if device information of a wearable electronic device includes a sensor model, a current battery, and a power consumption speed, a weighted characteristic value of the wearable electronic device=Characteristic value of a sensor signal×Weight of the sensor model+Characteristic value of the current battery×Weight of the current battery+Characteristic value of the power consumption speed×Weight of the power consumption speed.

A rule for assigning a weight and determining is as follows. A device identification and a current battery in device information, and at least one device information characteristic of a power consumption speed or a sensor model are considered in a determining process, and specific weights are assigned thereto, and weighted determining is performed, to determine a target wearable electronic device. Alternatively, a user directly selects and determines a target wearable electronic device.

A specific rule for assigning a weight and determining is as follows.

(1) When device information includes only a device identification, if it is determined, according to the device identification, that at least two wearable electronic devices that support a same function include both a carry-on wearable electronic device and a non-carry-on wearable electronic device, because the non-carry-on wearable electronic device has better performance than the carry-on wearable electronic device and has low sensitivity to power consumption, the carry-on wearable electronic device is automatically determined as a target wearable electronic device, and a corresponding service on the carry-on wearable electronic device is disabled.

(2) When device information includes a device identification, a current battery, and a power consumption speed, if it is determined, according to the device identification, that at least two wearable electronic devices that support a same function include both a carry-on wearable electronic device and a non-carry-on wearable electronic device, because the non-carry-on wearable electronic device has better performance than the carry-on wearable electronic device and has low sensitivity to power consumption, the carry-on wearable electronic device is automatically determined as a target wearable electronic device, and a corresponding service on the carry-on wearable electronic device is disabled, or if it is determined, according to the device identification, that wearable electronic devices that support a same function are all carry-on wearable electronic devices or are all non-carry-on wearable electronic devices, determining is performed according to the current battery and the power consumption speed. A specific rule for assigning a weight and determining is as follows. A weight of the power consumption speed is set to be relatively high during weight setting, which is higher than a weight of the current battery such that the weight of the power consumption speed becomes a major factor in a determining process when current batteries of the wearable electronic devices are all sufficient and are all greater than a first threshold (for example, greater than 50%). In this way, after weighted determining is performed, a device with a lowest power consumption speed is selected to continue to execute a corresponding function, and the other devices are determined as target wearable electronic devices. A weight of the current battery is set to be relatively high during weight setting, which is higher than a weight of the power consumption speed such that the weight of the current battery becomes a major factor in a determining process when at least one of current batteries of the wearable electronic devices is less than a first threshold (for example, less than 50%). In this way, after weighted determining is performed, a device with a highest current battery is selected to continue to execute a corresponding function, and the other devices are determined as target wearable electronic devices. Certainly, the foregoing weight assignment process illustrates only that, under a specific condition, a certain characteristic can most affect a determining result, but cannot illustrate that a certain characteristic can determine a determining result. A final determining result should be determined by comprehensively considering multiple device information characteristics. For specific implementation manners, specific determining processes are not always the same because manners of setting a device information characteristic value and assigning a weight are different, but all should meet the foregoing rule for weight assignment and weighted determining.

(3) When device information includes a device identification, a current battery, and a sensor model, if it is determined, according to the device identification, that at least two wearable electronic devices that support a same function include both a carry-on wearable electronic device and a non-carry-on wearable electronic device, because the non-carry-on wearable electronic device has better performance than the carry-on wearable electronic device and has low sensitivity to power consumption, the carry-on wearable electronic device is automatically determined as a target wearable electronic device, and a corresponding service on the carry-on wearable electronic device is disabled, or determining is performed according to the current battery and the sensor model if it is determined, according to the device identification, that wearable electronic devices that support a same function are all carry-on wearable electronic devices or are all non-carry-on wearable electronic devices. A specific rule for assigning a weight and determining is as follows. A weight of the sensor model is set to be relatively high during weight setting, which is higher than a weight of the current battery such that the weight of the sensor model becomes a major factor in a determining process when current batteries of the wearable electronic devices are all sufficient and are all greater than a second threshold (for example, greater than 50%). In this way, after weighted determining is performed, a device with optimal sensor performance is selected to continue to execute a corresponding function, and the other devices are determined as target wearable electronic devices. A weight of the current battery is set to be relatively high during weight setting, which is higher than a weight of the sensor model such that the weight of the current battery becomes a major factor in a determining process when at least one of current batteries of the wearable electronic devices is less than a first threshold (for example, less than 50%). In this way, after weighted determining is performed, a device with a highest current battery is selected to continue to execute a corresponding function, and the other devices are determined as target wearable electronic devices. Certainly, the foregoing weight assignment process illustrates only that, under a specific condition, a certain characteristic can most affect a determining result, but cannot illustrate that a certain characteristic can determine a determining result. A final determining result should be determined by comprehensively considering multiple device information characteristics. For specific implementation manners, specific determining processes are not always the same because manners of setting a device information characteristic value and assigning a weight are different, but all should meet the foregoing rule for weight assignment and weighted determining.

(4) When device information includes a device identification, a current battery, a power consumption speed, and a sensor model, if it is determined, according to the device identification, that at least two wearable electronic devices that support a same function include both a carry-on wearable electronic device and a non-carry-on wearable electronic device, because the non-carry-on wearable electronic device has better performance than the carry-on wearable electronic device and has low sensitivity to power consumption, the carry-on wearable electronic device is automatically determined as a target wearable electronic device, and a corresponding service on the carry-on wearable electronic device is disabled, or determining is performed according to the current battery, the power consumption speed, and the sensor model if it is determined, according to the device identification, that wearable electronic devices that support a same function are all carry-on wearable electronic devices or are all non-carry-on wearable electronic devices. A specific rule for assigning a weight and determining is as follows. A weight of the current battery and a weight of the power consumption speed are set to be relatively low during weight setting such that the weight of the current battery and the weight of the power consumption speed become minor factors in a determining process, and a weight of the sensor model characteristic is set to be the highest such that the weight of the sensor model characteristic becomes a major factor in the determining process when current batteries of the wearable electronic devices are all sufficient and are all greater than a third threshold (for example, greater than 50%). In this way, after weighted determining is performed, a device with optimal performance is selected to continue to execute a corresponding function, and the other devices are determined as target wearable electronic devices. A power consumption speed of a device directly affects duration during which the wearable electronic device works when current batteries of the wearable electronic devices are all greater than a fourth threshold (for example, greater than 30%) and at least one of the current batteries of the wearable electronic devices is less than a third threshold (for example, less than 50%). Therefore, a weight of the current battery and a weight of the sensor model are set to be relatively low during weight assignment, and a weight of the power consumption speed is set to be the highest such that the weight of the power consumption speed becomes a major factor in a determining process. In this way, after weighted determining is performed, a device with a lowest power consumption speed is selected to continue to execute a corresponding function, and the other devices are determined as target wearable electronic devices. The current battery is the most primary consideration factor when at least one of the current batteries of the wearable electronic devices is less than a fourth threshold (for example, less than 30%). Therefore, a weight of the power consumption speed and a weight of the sensor model are set to be relatively low during weight assignment, and a weight of the current battery characteristic is set to be the highest. In this way, after weighted determining is performed, a device with a highest current battery is selected to continue to execute a corresponding function, and the other devices are determined as target wearable electronic devices. Certainly, the foregoing weight assignment process illustrates only that, under a specific condition, a certain characteristic can most affect a determining result, but cannot illustrate that a certain characteristic can determine a determining result, and a final determining result should be determined by comprehensively considering multiple device information characteristics. For specific implementation manners, specific determining processes are not always the same because manners of setting a device information characteristic value and assigning a weight are different, but all should meet the foregoing rule for weight assignment and weighted determining.

FIG. 1 is a flowchart of Embodiment 1 of a method for controlling wearable electronic devices according to the present disclosure. As shown in FIG. 1, the method provided in this embodiment may include the following steps.

Step 101: After establishing communication connections to at least two wearable electronic devices, a central device determines whether the at least two wearable electronic devices support a same function.

Step 102: If the at least two wearable electronic devices support a same function, obtain device information of the wearable electronic devices that support the same function, and determine, according to the device information, at least one of the wearable electronic devices that support the same function as a target wearable electronic device.

Step 103: Disable a service that is corresponding to the same function and that is on the target wearable electronic device.

First, a central device separately establishes a communication connection to at least two wearable electronic devices, for exchanging data.

Then, the central device determines whether the at least two wearable electronic devices support a same function, the central device obtains device information of the wearable electronic devices that support the same function if it is determined that the at least two wearable electronic devices support a same function, and the central device determines, according to the obtained device information and according to a preset determining rule, at least one of the wearable electronic devices that support the same function as the target wearable electronic device.

Finally, the central device disables a service that is corresponding to the same function and that is on the target wearable electronic device.

In the technical solution of this embodiment, by performing the foregoing steps, the central device is enabled to perform, on the at least two wearable electronic devices, scheduling and configuration management of the service corresponding to the supported same function, which helps reduce power consumption of the wearable electronic devices.

The following uses several specific embodiments to describe in detail the technical solution of the method embodiment shown in FIG. 1.

Figure 2:
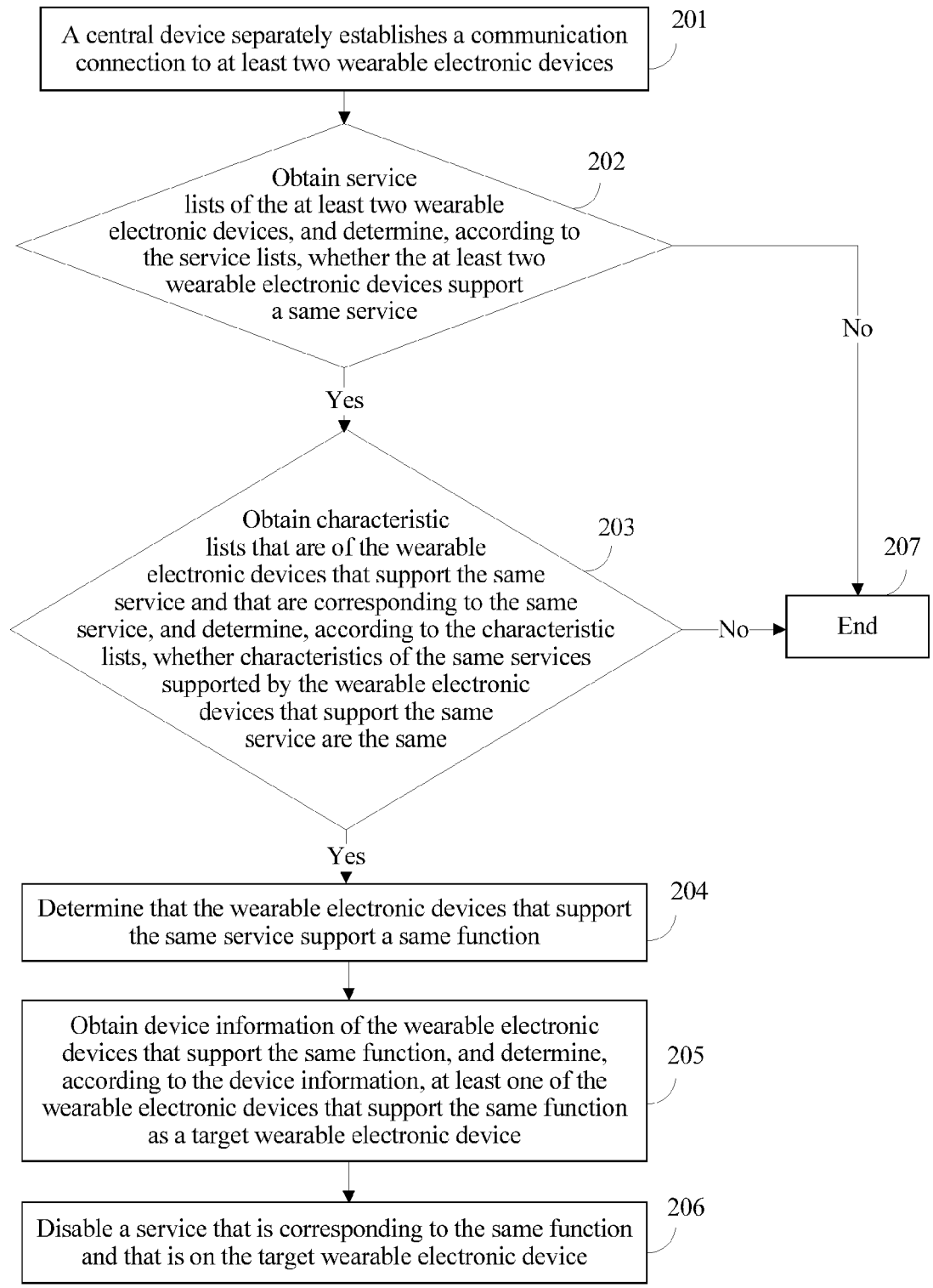
FIG. 2 is a flowchart of Embodiment 2 of a method for controlling wearable electronic devices according to the present disclosure.

FIG. 2 is a flowchart of Embodiment 2 of a method for controlling wearable electronic devices according to the present disclosure. As shown in FIG. 2, the solution of this embodiment may include the following steps.

Step 201: A central device separately establishes a communication connection to at least two wearable electronic devices.

The central device and the at least two wearable electronic devices all support a BLUETOOTH or BLUETOOTH low energy protocol. The central device separately establishes a BLUETOOTH connection to the at least two wearable electronic devices, to form a BLUETOOTH PICONET. The central device is a primary device in the BLUETOOTH PICONET and is responsible for establishing and maintaining the network, and the at least two wearable electronic devices are both secondary devices in the BLUETOOTH PICONET, and the wearable electronic devices may report data to the central device or exchange data with the central device according to a function of the wearable electronic devices and a supported service.

Step 202: Obtain service lists of the at least two wearable electronic devices, and determine, according to the service lists, whether the at least two wearable electronic devices support a same service.

The central device sends a generic attribute profile (GATT) discover all primary services request command to each wearable electronic device respectively, requesting to obtain a service list supported by each wearable electronic device, where the list may exist in one or more forms. In addition, obtained services not only exist in a form of a list, but may also exist in another form, which is not limited herein. After receiving the request command, each wearable electronic device sends a GATT discover all primary services response message to the central device, where the response message carries the service list supported by each wearable electronic device.

After obtaining the service list supported by each wearable electronic device, the central device determines whether the wearable electronic devices support a same service, where there may be one or more supported same services, which is not limited herein. If the wearable electronic devices support a same service, step 203 is performed, or if the wearable electronic devices do not support a same service, end step 207 is performed.

Step 203: Obtain characteristic lists that are of the wearable electronic devices that support the same service and that are corresponding to the same service, and determine, according to the characteristic lists, whether characteristics of the same services supported by the wearable electronic devices that support the same service are the same.

The central device separately sends a GATT discover all characteristic of services request command to the wearable electronic devices that support the same service, requesting to obtain the characteristic list that is of the service and that is of each wearable electronic device, where the list may exist in one or more forms. In addition, obtained characteristics not only exist in a form of a list, but may also exist in another form, which is not limited herein. After receiving the request command, each wearable electronic device sends a GATT discover all characteristic of services response message to the central device, where the response message carries the characteristic list that is of the service and that is of each wearable electronic device. After obtaining the characteristic lists that are of the service and that are of the wearable electronic devices, the central device determines whether characteristics of the same services supported by the wearable electronic devices are completely the same. If the characteristics are completely the same, step 204 is performed, or if the characteristics are not completely the same, end step 207 is performed.

Step 204: Determine that the wearable electronic devices that support the same service support a same function.

The central device determines that the wearable electronic devices that support the same service support the same function after determining that the same services supported by the wearable electronic devices have completely same characteristics.

Step 205: Obtain device information of the wearable electronic devices that support the same function, and determine, according to the device information, at least one of the wearable electronic devices that support the same function as a target wearable electronic device.

The central device invokes an acquisition command from the wearable electronic devices that support the same function, where the acquisition command instructs to obtain the device information of the wearable electronic devices that support the same function. The device information includes a device identification and a current battery, and further includes at least one of a power consumption speed or a sensor model.

The central device determines, according to the foregoing obtained device information, at least one of the wearable electronic devices that support the same function as the target wearable electronic device.

Further, according to a characteristic value corresponding to the device information of each of the wearable electronic devices that support the same function and according to a weight of each type of device information, the central device calculates a sum of results obtained by multiplying the characteristic value of each characteristic in the device information by a weight corresponding to the characteristic, to obtain a result, which is a weighted characteristic value, and determines, according to the result and according to a determining rule, the target wearable electronic device from the wearable electronic devices that support the same function.

Step 206: Disable a service that is corresponding to the same function and that is on the target wearable electronic device.

The central device sends, according to a result of the determining in step 205, a disconnection request to a Logical Link Control and Adaptation Protocol (L2CAP) layer connection that is on the target wearable electronic device and that supports same function service data. After receiving the request, the target wearable electronic device returns a disconnection response and disconnects the L2CAP connection. The service that is on the target wearable electronic device and that is corresponding to the same function is disabled.

In this embodiment, a central device separately establishes a communication connection to at least two wearable electronic devices. The central device separately obtains service lists supported by the at least two wearable electronic devices, and determines, according to the service lists, whether the at least two wearable electronic devices support a same service, and the central device obtains characteristic lists that are of the wearable electronic devices that support the same service and that are corresponding to the same service if the at least two wearable electronic devices support a same service, and determines that the at least two wearable electronic devices support a same function if the supported same services have completely same characteristics. Then, the central device obtains device information of the wearable electronic devices that support the same function. According to a characteristic value corresponding to the device information of each of the wearable electronic devices that support the same function and according to a weight of each type of device information, the central device calculates a sum of results obtained by multiplying the characteristic value of each characteristic in the device information by a weight corresponding to the characteristic, to obtain a result, which is a weighted characteristic value, and determines, according to the result and according to a determining rule, a target wearable electronic device from the wearable electronic devices that support the same function. Finally, the central device disables a service that is corresponding to the same function and that is on the target wearable electronic device. This implements automatic configuration and function scheduling of at least two wearable electronic devices in a case in which the at least two wearable electronic devices are both operating, thereby reducing power consumption of the wearable electronic devices as far as possible without affecting service quality and user experience.

Several groups of instances are given in the following as examples, to illustrate a process of assigning a weight and determining a target wearable electronic device.

(1) A same BLUETOOTH PICONET includes three wearable electronic devices, A, B, and C, which separately establish a BLUETOOTH connection to a central device. Device A is a smart watch, device B is a smart band, and device C is a sphygmomanometer. These three wearable electronic devices all support a heart rate measurement service (same as HRS), and are all equipped with a heart rate sensor. Device information of these three wearable electronic devices obtained by the central device is shown in the following table.

| Characteristic name | Device information Device identification | |
|---|---|---|
| Characteristic value | A | 1 |
| | B | 1 |
| | C | 2 |

As shown in the foregoing table, the characteristic values of the device identifications of device A and device B are 1, representing that these two devices are carry-on wearable electronic devices, and the characteristic value of the device identification of device C is 2, representing that device C is a non-carry-on wearable electronic device. According to a rule for setting a weight and a weighted characteristic value for the device information, in this case, device A and device B are determined as target wearable electronic devices, and the HRS on device A and device B is disabled. It should be noted herein that, this embodiment of the present disclosure sets no limitation on a quantity of determined target wearable electronic devices, that is, does not set a limitation that a service on only one wearable electronic device is reserved for operating.

(2) A same BLUETOOTH PICONET includes two wearable electronic devices, A and B, which separately establish a BLUETOOTH connection to a central device. Device A is a smart watch and device B is smart glasses. These two wearable electronic devices both support an alert notification service (ANS) and do not use a sensor. Device information of these two wearable electronic devices obtained by the central device is shown in the following table.

| Characteristic name | Device information | | |
|---|---|---|---|
| | Device identification | Current battery | Power consumption speed |
| Characteristic value | A | 1 | 0.75 | 0.4 |
| | B | 1 | 0.62 | 0.25 |

As shown in the foregoing table, the characteristic values of the device identifications of device A and device B are 1, representing that these two devices are carry-on wearable electronic devices, and the characteristic values of the current batteries of the foregoing two wearable electronic devices are both above a first threshold (where the first threshold is set to 0.5). According to a rule for setting a weight and a weighted characteristic value for the device information, in this case, a weight corresponding to the power consumption speed is increased and is set to be the highest weight, and weights corresponding to the characteristics in the device information are shown in the following table.

| Characteristic name | Device information | | |
|---|---|---|---|
| | Device identification | Current battery | Power consumption speed |
| Weight | 0.1 | 0.2 | 0.7 |

After the weights are set, calculation of weighted characteristic values starts, to obtain a final weighted characteristic value. A specific process is as follows.

Weighted characteristic value of device A: 1×0.1+0.75×0.2+0.4×0.7=0.53; and

Weighted characteristic value of device B: 1×0.1+0.62×0.2+0.25×0.7=0.399.

The weighted characteristic value of device A is the greatest. Then, it is determined that device B is a target wearable electronic device, and the ANS on device B is disabled. It should be noted herein that, not in all determining processes does a wearable electronic device with a small weighted characteristic value be determined as a target wearable electronic device. In some cases, a device with a great weighted characteristic value is determined as a target wearable electronic device, which depends on a setting of a characteristic value in device information. In addition, this embodiment of the present disclosure sets no limitation on a quantity of determined target wearable electronic devices, that is, does not set a limitation that a service on only one wearable electronic device is reserved for operating.

(3) A same BLUETOOTH PICONET includes three wearable electronic devices, A, B, and C, which separately establish a BLUETOOTH connection to a central device. Device A is a smart watch, device B is a smart band, and device C is a smart suspender. These three wearable electronic devices all support an HRS, and are all equipped with a heart rate sensor. Device information of these three wearable electronic devices obtained by the central device is shown in the following table.

|  | Device information | | |
|---|---|---|---|
| Characteristic name | Device identification | Current battery | Sensor model |
| Characteristic value | A 1 | 0.75 | 0.4 |
|  | B 1 | 0.62 | 0.25 |
|  | C 1 | 0.43 | 0.25 |

As shown in the foregoing table, the characteristic values of the device identifications of devices A, B, and C are all 1, representing that these three devices are all carry-on wearable electronic devices, and the characteristic values of the current batteries of device A and device B are both above a second threshold (where the second threshold is set to 0.5), but the characteristic value of the current battery of device C is below the second threshold (where the second threshold is set to 0.5). Therefore, the characteristic values of the current batteries of the foregoing three wearable electronic devices are located in different threshold intervals. According to a rule for setting a weight and a weighted characteristic value for the device information, in this case, a determining criterion corresponding to the lowest threshold interval is used. That is, a weight corresponding to the current battery characteristic is increased and is set to be the highest weight. Then, weights corresponding to the device information are shown in the following table.

|  | Device information | | |
|---|---|---|---|
| Characteristic name | Device identification | Current battery | Sensor model |
| Weight | 0.1 | 0.7 | 0.2 |

After the weights are set, calculation of weighted characteristic values starts, to obtain a final weighted characteristic value. A specific process is as follows.

Weighted characteristic value of device A: 1×0.1+0.75×0.7+0.4×0.2=0.705;

Weighted characteristic value of device B: 1×0.1+0.62×0.7+0.25×0.2=0.584; and

Weighted characteristic value of device C: 1×0.1+0.43×0.7+0.25×0.2=0.451.

The weighted characteristic value of device A is the greatest. Then, it is determined that device B and device C are target wearable electronic devices, and the HRS on device B and device C is disabled. It should be noted herein that, not in all determining processes does a wearable electronic device with a small weighted characteristic value be determined as a target wearable electronic device. In some cases, a device with a great weighted characteristic value is determined as a target wearable electronic device, which depends on a setting of a characteristic value in device information. In addition, this embodiment of the present disclosure sets no limitation on a quantity of determined target wearable electronic devices, that is, does not set a limitation that a service on only one wearable electronic device is reserved for operating.

(4) A same BLUETOOTH PICONET includes three wearable electronic devices, A, B, and C, which separately establish a BLUETOOTH connection to a central device. Device A is a smart watch, device B is a smart band, and device C is a sphygmomanometer. These three wearable electronic devices all support an HRS, and are all equipped with a heart rate sensor. Device information of these three wearable electronic devices obtained by the central device is shown in the following table

|  | Device information | | | |
|---|---|---|---|---|
| Characteristic name | Device identification | Sensor model | Current battery | Power consumption speed |
| Characteristic value | A 1 | 0.6 | 0.45 | 0.4 |
|  | B 1 | 0.5 | 0.62 | 0.25 |
|  | C 2 | 0.8 | 0.80 | 0.65 |

As shown in the foregoing table, the characteristic values of the device identifications of device A and device B are 1, representing that these two devices are carry-on wearable electronic devices, and the characteristic value of the device identification of device C is 2, representing that device C is a non-carry-on wearable electronic device. According to a rule for setting a weight and a weighted characteristic value for the device information, in this case, a weight corresponding to the device identification characteristic is set to be the highest, which may be set to 1, and weights corresponding to the other characteristics are set to 0. Then, weights corresponding to the characteristics in the device information are shown in the following table.

|  | Device information | | | |
|---|---|---|---|---|
| Characteristic name | Device identification | Sensor model | Current battery | Power consumption speed |
| Weight | 1 | 0 | 0 | 0 |

After the weights are set, calculation of weighted characteristic values starts, to obtain a final weighted characteristic value. A specific process is as follows.

Weighted characteristic value of device A: 1×1+0.6×0+0.45×0+0.4×0=1;

Weighted characteristic value of device B: 1×1+0.5×0+0.62×0+0.25×0=1; and

Weighted characteristic value of device C: 2×1+0.8×0+0.8×0+0.65×0=2.

The weighted characteristic value of device C is the greatest. Then, it is determined that device A and device B are target wearable electronic devices, and the HRS on device A and device B is disabled. It should be noted herein that, not in all determining processes does a wearable electronic device with a small weighted characteristic value be determined as a target wearable electronic device. In some cases, a device with a great weighted characteristic value is determined as a target wearable electronic device, which depends on a setting of a characteristic value in device information. In addition, this embodiment of the present disclosure sets no limitation on a quantity of determined target wearable electronic devices, that is, does not set a limitation that a service on only one wearable electronic device is reserved for operating.

(5) A same BLUETOOTH PICONET includes three wearable electronic devices, A, B, and C, which separately establish a BLUETOOTH connection to a central device. Device A is a smart watch, device B is a smart band, and device C is a smart suspender. These three wearable electronic devices all support an HRS, and are all equipped with a heart rate sensor. Device information of these three wearable electronic devices obtained by the central device is shown in the following table.

|  | Device information | | | |
| --- | --- | --- | --- | --- |
| Characteristic name | Device identification | Sensor model | Current battery | Power consumption speed |
| Characteristic value | A | 1 | 0.6 | 0.78 | 0.4 |
|  | B | 1 | 0.5 | 0.68 | 0.25 |
|  | C | 1 | 0.8 | 0.80 | 0.65 |

As shown in the foregoing table, the characteristic values of the device identifications of device A, B, and C are all 1, representing that these three devices are all carry-on wearable electronic devices, and the characteristic values of the current batteries of the foregoing three wearable electronic devices are all above a first threshold (where the first threshold is set to 0.5). According to a rule for setting a weight and a weighted characteristic value for the device information, in this case, a weight corresponding to the sensor model is increased and is set to be the highest weight, and weights corresponding to the device information are shown in the following table.

|  | Device information | | | |
| --- | --- | --- | --- | --- |
| Characteristic name | Device identification | Sensor model | Current battery | Power consumption speed |
| Weight | 0.1 | 0.7 | 0.1 | 0.1 |

After the weights are set, calculation of weighted characteristic values starts, to obtain a final weighted characteristic value. A specific process is as follows.

Weighted characteristic value of device A: 1×0.1+0.6×0.7+0.78×0.1+0.4×0.1=0.638;

Weighted characteristic value of device B: 1×0.1+0.5×0.7+0.68×0.1+0.25×0.1=0.543; and Weighted characteristic value of device C: 1×0.1+0.8×0.7+0.8×0.1+0.65×0.1=0.805.

The weighted characteristic value of device C is the greatest. Then, it is determined that device A and device B are target wearable electronic devices, and the HRS on device A and device B is disabled. It should be noted herein that, not in all determining processes does a wearable electronic device with a small weighted characteristic value be determined as a target wearable electronic device. In some cases, a device with a great weighted characteristic value is determined as a target wearable electronic device, which depends on a setting of a characteristic value in device information. In addition, this embodiment of the present disclosure sets no limitation on a quantity of determined target wearable electronic devices, that is, does not set a limitation that a service on only one wearable electronic device is reserved for operating.

(6) A same BLUETOOTH PICONET includes three wearable electronic devices, A, B, and C, which separately establish a BLUETOOTH connection to a central device. Device A is a smart watch, device B is a smart band, and device C is a smart suspender. These three wearable electronic devices all support an HRS, and are all equipped with a heart rate sensor. Device information of these three wearable electronic devices obtained by the central device is shown in the following table.

|  | Device information | | | |
| --- | --- | --- | --- | --- |
| Characteristic name | Device identification | Sensor model | Current battery | Power consumption speed |
| Characteristic value | A | 1 | 0.6 | 0.45 | 0.4 |
|  | B | 1 | 0.5 | 0.40 | 0.25 |
|  | C | 1 | 0.8 | 0.38 | 0.65 |

As shown in the foregoing table, the characteristic values of the device identifications of device A, B, and C are all 1, representing that these three devices are all carry-on wearable electronic devices. In terms of the characteristic values of the power consumption speeds of the foregoing three wearable electronic devices, the power consumption speed of device B is the highest and the power consumption speed of device C is the lowest. The characteristic values of the current batteries of the foregoing three wearable electronic devices are all located between a third threshold and a fourth threshold (where the third threshold is set to 0.5 and the fourth threshold is set to 0.3). According to a rule for setting a weight and a weighted characteristic value for the device information, in this case, a weight corresponding to the power consumption speed characteristic is increased and is set to be the highest weight, and weights corresponding to the characteristics in the device information are shown in the following table.

|  | Device information | | | |
| --- | --- | --- | --- | --- |
| Characteristic name | Device identification | Sensor model | Current battery | Power consumption speed |
| Weight | 0.1 | 0.1 | 0.2 | 0.6 |

After the weights are set, calculation of weighted characteristic values starts, to obtain a final weighted characteristic value. A specific process is as follows.

Weighted characteristic value of device A: 1×0.1+0.6×0.1+0.45×0.2+0.4×0.6=0.49;

Weighted characteristic value of device B: 1×0.1+0.5×0.1+0.4×0.2+0.25×0.6=0.38; and Weighted characteristic value of device C: 1×0.1+0.8×0.1+0.38×0.2+0.65×0.6=0.646.

The weighted characteristic value of device C is the greatest. Then, it is determined that device A and device B are target wearable electronic devices, and the HRS on device A and device B is disabled. It should be noted herein that, not in all determining processes does a wearable electronic device with a small weighted characteristic value be determined as a target wearable electronic device. In some cases, a device with a great weighted characteristic value is determined as a target wearable electronic device, which depends on a setting of a characteristic value in device information. In addition, this embodiment of the present disclosure sets no limitation on a quantity of determined target wearable electronic devices, that is, does not set a limitation that a service on only one wearable electronic device is reserved for operating.

(7) A same BLUETOOTH PICONET includes three wearable electronic devices, A, B, and C, which separately establish a BLUETOOTH connection to a central device. Device A is a smart watch, device B is a smart band, and device C is a smart suspender. These three wearable electronic devices all support an HRS, and are all equipped with a heart rate sensor. Device information of these three wearable electronic devices obtained by the central device is shown in the following table.

| Characteristic name | Device information | | | |
| --- | --- | --- | --- | --- |
| | Device identification | Sensor model | Current battery | Power consumption speed |
| Characteristic value | A | 1 | 0.6 | 0.65 | 0.4 |
| | B | 1 | 0.5 | 0.57 | 0.25 |
| | C | 1 | 0.8 | 0.28 | 0.65 |

As shown in the foregoing table, the characteristic values of the device identifications of devices A, B, and C are all 1, representing that these three devices are all carry-on wearable electronic devices, and the characteristic values of the current batteries of device A and device B are both above a third threshold (where the third threshold is set to 0.5), but the characteristic value of the current battery of device C is below a fourth threshold (where the second threshold is set to 0.3). Therefore, the characteristic values of the current batteries of the foregoing three wearable electronic devices are located in different threshold intervals. According to a rule for setting a weight and a weighted characteristic value for the device information, in this case, a determining criterion corresponding to the lowest threshold interval is used. That is, a weight corresponding to the current battery characteristic is increased and is set to be the highest weight. Then, weights corresponding to the device information are shown in the following table.

| Characteristic name | Device information | | | |
| --- | --- | --- | --- | --- |
| | Device identification | Sensor model | Current battery | Power consumption speed |
| Weight | 0.1 | 0.1 | 0.5 | 0.3 |

After the weights are set, calculation of weighted characteristic values starts, to obtain a final weighted characteristic value. A specific process is as follows.

weighted characteristic value of device A: 1×0.1+0.6×0.1+0.65×0.5+0.4×0.3=0.655;

weighted characteristic value of device B: 1×0.1+0.5×0.1+0.57×0.5+0.25×0.3=0.5125; and weighted characteristic value of device C: 1×0.1+0.8×0.1+0.28×0.5+0.65×0.3=0.515.

The weighted characteristic value of device A is the greatest. Then, it is determined that device B and device C are target wearable electronic devices, and the HRS on device B and device C is disabled. It should be noted herein that, not in all determining processes does a wearable electronic device with a small weighted characteristic value be determined as a target wearable electronic device. In some cases, a device with a great weighted characteristic value is determined as a target wearable electronic device, which depends on a setting of a characteristic value in device information. In addition, this embodiment of the present disclosure sets no limitation on a quantity of determined target wearable electronic devices, that is, does not set a limitation that a service on only one wearable electronic device is reserved for operating.

Figure 3:
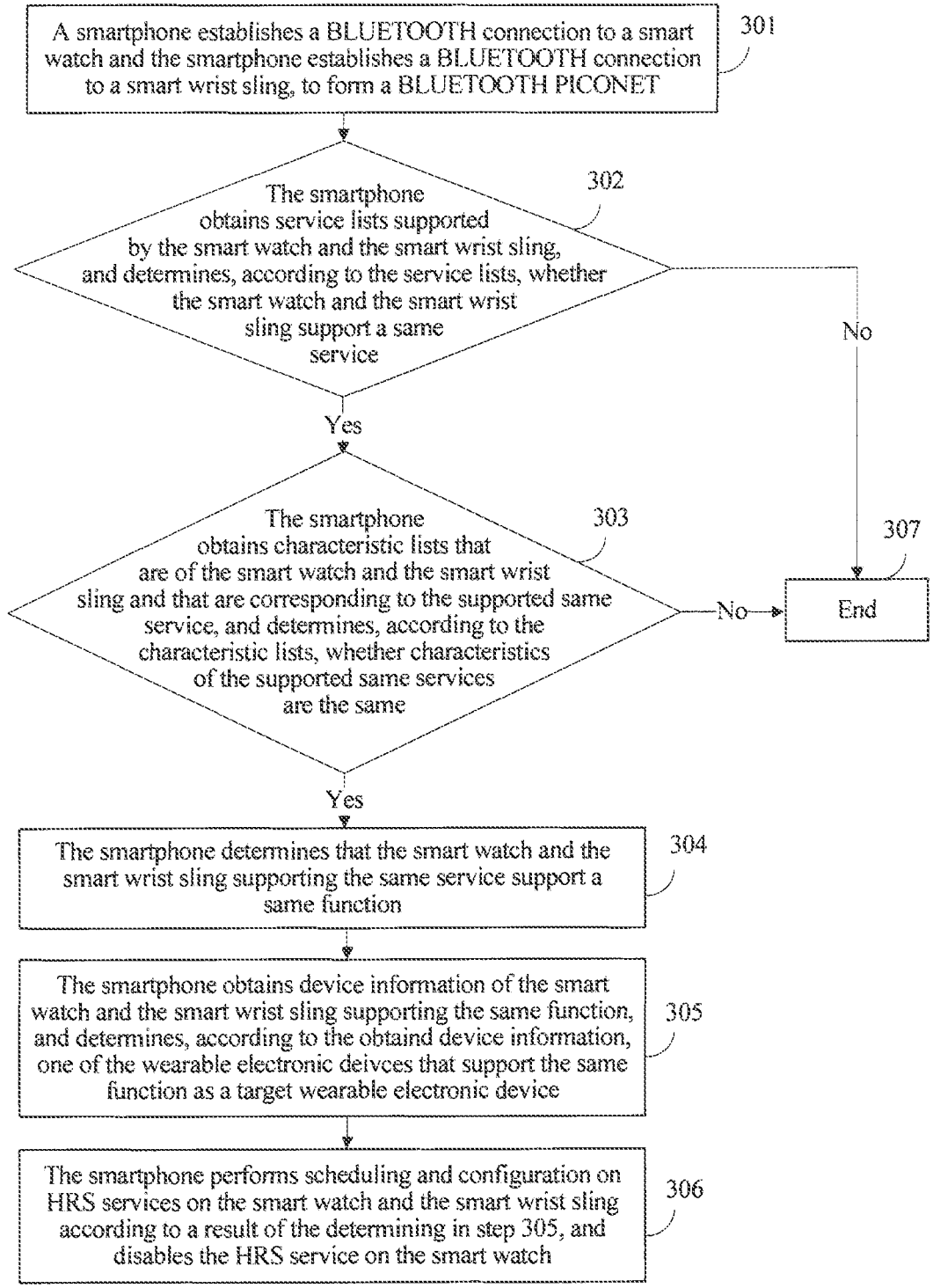
FIG. 3 is a flowchart of Embodiment 3 of a method for controlling wearable electronic devices according to the present disclosure.

FIG. 3 is a flowchart of Embodiment 3 of a method for controlling wearable electronic devices according to the present disclosure. On the basis of Embodiment 2 of the present disclosure, the technical solutions of the present disclosure are further described using examples. In this embodiment of the present disclosure, a central device is a smartphone, and wearable electronic devices are a smart watch and a smart wrist sling. The smartphone plays a role of a primary device, and the two wearable electronic devices, the smart wrist sling and the smart watch, play a role of secondary devices. The smart wrist sling is equipped with a heart rate sensor and a step counting sensor. The heart rate sensor is configured to measure a heart rate of a user, record a measurement result, and report the result to the smartphone or store the result in a local storage medium of the smart wrist sling (if the smart wrist sling has a local storage function) periodically or in real time. The step counting sensor is configured to record and measure a step count and a walking speed of the user when the user walks or runs, may calculate a calorie consumption status of the user in a movement process according to the foregoing parameters, and report the recorded step count and walking speed and a calculated numerical value of consumed calories to the smartphone or store the recorded step count and walking speed and a calculated numerical value of consumed calories in the storage medium of the smart wrist sling (if the smart wrist sling has the local storage function) periodically or in real time. A main function of the smart wrist sling is performing exercise management, health management, and sleep quality management by relying on physiological indicator data measured, collected, and calculated by the foregoing sensors. An intelligence level of the smart watch is higher than that of the smart wrist sling. An ANDROID operating system developed by GOOGLE Inc. or an iOS operating system developed by APPLE Inc., or an embedded operating system developed by another company is installed in a storage unit of the smart watch. The smart watch can exchange data with the smartphone and supports functions such as incoming call notification, unread information reading, and alarm notification when the mobile phone goes beyond a range of the smart watch. In addition, the smart watch also integrates a heart rate sensor, which is configured to measure a heart rate of the user and monitor health and exercise statuses of the user.

As shown in FIG. 3, steps of this embodiment of the present disclosure include the following steps.

Step 301: The smartphone establishes a BLUETOOTH connection to the smart watch and the smartphone establishes a BLUETOOTH connection to the smart wrist sling, to form a BLUETOOTH PICONET.

First, a BLUETOOTH module is enabled on the smartphone, the smart watch, and the smart wrist sling. Herein, discovery, matching, and connection establishment processes of the different wearable electronic devices are not always the same because the wearable electronic devices greatly differ in terms of function and intelligence level. Using the application scenario described in this embodiment of the present disclosure as an example, the smart watch is a wearable electronic device with a relatively high intelligence level and is a device with a screen, but the smart wrist sling is a wearable electronic device with a relatively low intelligence level and is a device without a screen.

Discovery, matching, and connection establishment processes of the smart watch are the same as those in a process of establishing a BLUETOOTH connection between mobile phones. A specific process is as follows. The smartphone externally broadcasts a search message in a specific time period at a specific frequency, the smart watch sends a search response message to the smartphone after receiving the search message broadcast by the smartphone, where the search response message carries a BLUETOOTH address and clock information of the BLUETOOTH module on the smart watch, and device discovery is completed when the smartphone receives the search response message of the smart watch. Then, the user can tap establishing connection on a screen of the smartphone. The smartphone sends a BLUETOOTH address and a BLUETOOTH clock of the smartphone to the smart watch, to synchronize clocks of the smart watch and the smartphone and establish a BLUETOOTH communication link between the smartphone and the smart watch. At the same time, the smartphone randomly generates a personal identification number (PIN) code and sends the PIN code to the smart watch. The smart watch displays the PIN code on the screen of the smart watch after receiving the message, and the user can check whether the PIN codes are consistent on the screens of the smartphone and the smart watch, thereby verifying connection validity. This is a commonly mentioned "matching" process. After the matching process is complete, the user chooses, on the smart watch, whether to accept or reject the BLUETOOTH connection. If the user chooses to accept the BLUETOOTH connection, the BLUETOOTH connection is established between the smartphone and the smart watch, and the two devices can exchange data through BLUETOOTH.

Because the smart wrist sling is a device without a screen, a matching process of the smart wrist sling does not require transmission of a PIN code. A specific process is as follows. There is a button on the smart wrist sling. The smart wrist sling enters a matching time window after the user presses the button, and the smart wrist sling listens, in this time window, to search messages sent by all BLUETOOTH devices, and returns a search response. Then, the smartphone broadcasts a search message. The smart wrist sling sends a search response message to the smartphone after receiving the search message, where the search response message carries a BLUETOOTH address and clock information of the BLUETOOTH module on the smart wrist sling, and then the smartphone sends a paging request to the smart wrist sling, where the paging request carries the BLUETOOTH address and the clock information of the BLUETOOTH module on the smartphone in order to synchronize a clock of the smart wrist sling. In this way, a BLUETOOTH link is established between the smartphone and the smart wrist sling. The smartphone sends a connection request to the smart wrist sling, and the smart wrist sling returns a connection response such that the two parties can exchange data through BLUETOOTH. The foregoing processes are all completed in the matching time window of the smart wrist sling. If the matching time window is missed, the smart wrist sling does not respond to any request, a connection establishment process also fails, and the foregoing processes must start over again.

It should be noted herein that, selection of BLUETOOTH discovery, matching, and connection establishment manners is not dependent on a type of a wearable electronic device, but is related to a function configuration of a specific wearable electronic device. For example, not all smart watches are wearable electronic devices with a relatively high intelligence level and with a screen. For those smart watches without a screen or with a screen for displaying time only, the foregoing second manner is used in BLUETOOTH discovery, matching, and connection establishment processes. For those smart wrist slings with a relatively high intelligence level and with a screen, the foregoing first manner is used in BLUETOOTH discovery, matching, and connection establishment processes.

Step 302: The smartphone obtains service lists supported by the smart watch and the smart wrist sling, and determines, according to the service lists, whether the smart watch and the smart wrist sling support a same service.

For a specific process of obtaining the service lists, refer to step 202 in Embodiment 2 of the present disclosure.

If the smart watch and the smart wrist sling support a same service, step 303 is performed, or if the smart watch and the smart wrist sling do not support a same service, end step 307 is performed.

Services supported by the smart watch include an ANS, a battery service (BAS), a current time service (CTS), a device information service (DIS), an HRS, an immediate alert service (IAS), a phone alert status service (PASS), and a reference time update service (RTUS). Services supported by the smart wrist sling include a BAS service, a DIS service, an HRS service, and a running speed and cadence service (RSCS). After obtaining the service lists supported by the smart watch and the smart wrist sling, the smartphone detects services supported by both the two devices, namely, the BAS, DIS, and HRS services, where the BAS and DIS services are basic services, and are available on every device. Therefore, a service actually supported by both the two devices is the HRS.

Step 303: The smartphone obtains characteristic lists that are of the smart watch and the smart wrist sling and that are corresponding to the supported same service, and determines, according to the characteristic lists, whether characteristics of the supported same services are the same.

For a specific process of obtaining the characteristic lists, refer to step 203 in Embodiment 2 of the present disclosure.

If the characteristics are completely the same, step 304 is performed, or if the characteristics are not completely the same, end step 307 is performed.

Characteristics of the HRS services supported by the two wearable electronic devices, the smart watch and the smart wrist sling, include HRM, body sensor location (BSL), and heart rate control point (HRCP). Therefore, it is determined that the characteristics of the HRS services supported by the smart watch and the smart wrist sling are completely the same.

Step 304: The smartphone determines that the smart watch and the smart wrist sling supporting the same service support a same function.

After determining that the characteristics of the services supported by the smart watch and the smart wrist sling are completely the same, the smartphone concludes that functions executed by the HRS services of the two devices are completely the same.

Step 305: The smartphone obtains device information of the smart watch and the smart wrist sling supporting the same function, and determines, according to the obtained device information, one of the wearable electronic devices that support the same function as a target wearable electronic device.

The obtained device information is shown as follows.

A device identification of the smart watch is "Smart Watch," and a device identification of the smart wrist sling is "Wrist Sling."

A sensor model equipped on the smart watch is "HK2000H," and a sensor model of the smart wrist sling is "XDS019."

A current battery of the smart watch is "44%," and a current battery of the smart wrist sling is "40%."

After a same time period, a battery of the smart watch is decreased from 44% to 40%, and a battery of the smart wrist sling is decreased from 40% to 39%. Therefore, it is concluded that a power consumption speed of the smart watch is "mediate" (M), and a power consumption speed of the smart wrist sling is "low" (L).

It is determined, according to a preset determining rule, that the two devices are both carry-on wearable electronic devices, current batteries of the two devices are both within a threshold range of 30%-50%, power consumption speeds of the two devices are of different levels, and the sensor models of the two devices are different. A weight corresponding to the power consumption speed is the highest, and a weight of the current battery and a weight of the sensor model are relatively low when the current batteries are both within the threshold range of 30%-50%. Therefore, a final weighted characteristic value is obtained through weighted determining, and it is determined to enable the HRS service on the smart wrist sling and accordingly disable the HRS service on the smart watch.

Step 306: The smartphone performs scheduling and configuration on the HRS services on the smart watch and the smart wrist sling according to a result of the determining in step 305, and disables the HRS service on the smart watch.

For a specific disabling process, refer to step 206 in Embodiment 2 of the present disclosure.

In this embodiment, a smartphone establishes a communication connection to a smart watch and the smartphone establishes a communication connection to a smart wrist sling. The smartphone separately obtains service lists supported by the smart watch and the smart wrist sling, and determines, according to the service lists, whether the smart watch and the smart wrist sling support a same service. The smartphone obtains characteristic lists that are of the smart watch and the smart wrist sling and that are corresponding to the same service if the smart watch and the smart wrist sling support a same service, and determines that the smart watch and the smart wrist sling support services corresponding to the same function if it is determined that characteristics of the supported same services are completely the same. Afterward, the smartphone obtains device information of the smart watch and the smart wrist sling. According to each characteristic value corresponding to the device information and according to a weight of each type of device information, the smartphone calculates a sum of results obtained by multiplying the characteristic value of each characteristic in the device information by a weight corresponding to the characteristic, to obtain a result, which is a weighted characteristic value, and determines, according to the result and according to a determining rule, a target wearable electronic device from the smart watch and the smart wrist sling supporting the same function. Finally, the smartphone disables a service that is corresponding to the same function and that is on the target wearable electronic device. This implements automatic configuration and function scheduling of the smart watch and the smart wrist sling in a case in which the smart watch and the smart wrist sling are both operating, thereby reducing power consumption of the wearable electronic devices as far as possible without affecting service quality and user experience.

Figure 4:
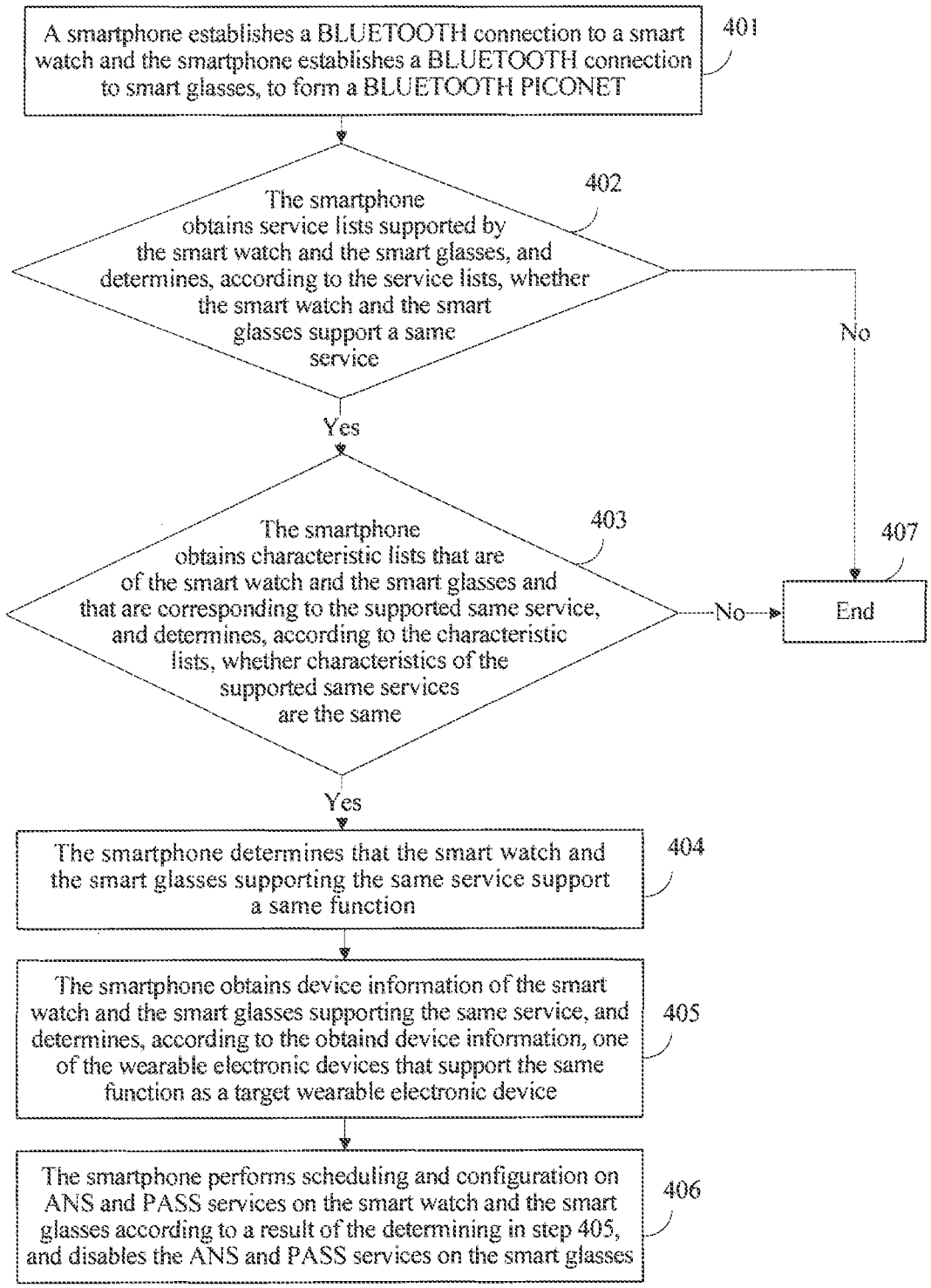
FIG. 4 is a flowchart of Embodiment 4 of a method for controlling wearable electronic devices according to the present disclosure.

FIG. 4 is a flowchart of Embodiment 4 of a method for controlling wearable electronic devices according to the present disclosure. On the basis of Embodiment 2 of the present disclosure, the technical solutions of the present disclosure are further described using examples. In this embodiment of the present disclosure, scheduling and configuration of wearable electronic devices involving no sensor are considered. A central device is a smartphone, and wearable electronic devices are a smart watch and a smart wrist sling. The smartphone plays a role of a primary device, and the two wearable electronic devices, the smart watch and the smart glasses play a role of secondary devices. An ANDROID operating system developed by GOOGLE Inc. or an iOS operating system developed by APPLE Inc., or an embedded operating system developed by another company is installed in storage units of the smart watch and the smart glasses. The smart watch and the smart glasses can exchange data with the smartphone and support functions such as incoming call notification, unread information reading, and alarm notification when the mobile phone goes beyond ranges of the smart watch and the smart glasses.

As shown in FIG. 4, steps of this embodiment of the present disclosure include the following steps.

Step 401: The smartphone establishes a BLUETOOTH connection to the smart watch and the smartphone establishes a BLUETOOTH connection to the smart glasses, to form a BLUETOOTH PICONET.

For a specific process, refer to step 301 in Embodiment 3 of the present disclosure.

Step 402: The smartphone obtains service lists supported by the smart watch and the smart glasses, and determines, according to the service lists, whether the smart watch and the smart glasses support a same service.

For a specific service discovery process, refer to step 202 in Embodiment 2 of the present disclosure.

If the smart watch and the smart glasses support a same service, step 403 is performed, or if the smart watch and the smart glasses do not support a same service, end step 407 is performed.

Services supported by the smart watch include an ANS, a CTS, a DIS, an HRS, an IAS, a PASS, and an RTUS. Services supported by the smart glasses include an ANS service, a BAS service, a CTS service, a DIS service, a PASS service, a video distribution profile (VDP), a subscriber identity module (SIM) access profile (SAP), and a human interface device (HID) service profile (HDP). After obtaining the service lists supported by the smart watch and the smart glasses, the smartphone detects services supported by both the two devices, namely, the ANS, BAS, DIS, and PASS services, where the BAS and HRS services are basic services, and are available on every device. Therefore, services actually supported by both the two devices are the ANS and the PASS.

Step 403: The smartphone obtains characteristic lists that are of the smart watch and the smart glasses and that are corresponding to the supported same service, and determines, according to the characteristic lists, whether characteristics of the supported same services are the same.

For a specific process of obtaining the characteristic lists, refer to step 203 in Embodiment 2 of the present disclosure.

If the characteristics are completely the same, step 404 is performed, or if the characteristics are not completely the same, end step 407 is performed.

Characteristics of the ANS services supported by the two wearable electronic devices, the smart watch and the smart glasses, include new alert, unread alert (Supported Unread Alert), and alert notification control point (Alert Notification CP), and characteristics of the characteristics are the same. Characteristics of the supported PASS services include alert status, ringer control point (Ringer CP), and ringer setting, and it is determined that the characteristics of the HRS services supported by the smart watch and the smart glasses are completely the same.

Step 404: The smartphone determines that the smart watch and the smart glasses supporting the same service support a same function.

After determining that the characteristics of the same services supported by the smart watch and the smart glasses are completely the same, the smartphone concludes that functions executed by the ANS service and the PASS service of the two devices are completely the same.

Step 405: The smartphone obtains device information of the smart watch and the smart glasses supporting the same service, and determines, according to the obtained device information, one of the wearable electronic devices that support the same function as a target wearable electronic device.

The obtained device information is shown as follows.

A device identification of the smart watch is "Smart Watch," and a device identification of the smart glasses is "Smart Glasses."

A current battery of the smart watch is 55%, and a current battery of the smart glasses is 28%.

After a same time period, a battery of the smart watch is decreased from 65% to 55%, and a battery of the smart wrist sling is decreased from 30% to 28%. Therefore, it is concluded that a power consumption speed of the smart watch is M, and a power consumption speed of the smart glasses is L.

It is determined, according to a preset determining rule, that the current battery (55%) of the smart watch is above a first threshold, whereas the current battery of the smart glasses is 28%, which is below the first threshold. Therefore, the current batteries of the smart watch and the smart glasses are located in different threshold intervals. In this case, weights are set according to a determining rule corresponding to the lowest threshold interval, and a weight of the current battery is set to be the highest. Therefore, a final weighted characteristic value is obtained through weighted determining, and it is determined to enable the ANS and PASS services on the smart watch and accordingly disable the ANS and PASS services on the smart glasses.

Step 406: The smartphone performs scheduling and configuration on the ANS and PASS services on the smart watch and the smart glasses according to a result of the determining in step 405, and disables the ANS and PASS services on the smart glasses.

For a specific disabling process, refer to step 206 in Embodiment 2 of the present disclosure.

In this embodiment, a smartphone establishes a communication connection to a smart watch and the smartphone establishes a communication connection to smart glasses. The smartphone separately obtains service lists supported by the smart watch and the smart glasses, and determines, according to the service lists, whether the smart watch and the smart glasses support a same service, and if the smart watch and the smart glasses support a same service, the smartphone obtains characteristic lists that are of the smart watch and the smart glasses and that are corresponding to the same service, and if it is determined that characteristics of the supported same services are completely the same, determines that the smart watch and the smart wrist sling support services corresponding to the same function. Afterward, the smartphone obtains device information of the smart watch and the smart glasses. According to each characteristic value corresponding to the device information and according to a weight of each type of device information, the smartphone calculates a sum of results obtained by multiplying the characteristic value of each characteristic in the device information by a weight corresponding to the characteristic, to obtain a result, which is a weighted characteristic value, and determines, according to the result and according to a determining rule, a target wearable electronic device from the smart watch and the smart glasses supporting the same function. Finally, the smartphone disables a service that is corresponding to the same function and that is on the target wearable electronic device. This implements automatic configuration and function scheduling of the smart watch and the smart glasses in a case in which the smart watch and the smart glasses are both operating, thereby reducing power consumption of the wearable electronic devices as far as possible without affecting service quality and user experience.

Figure 5:
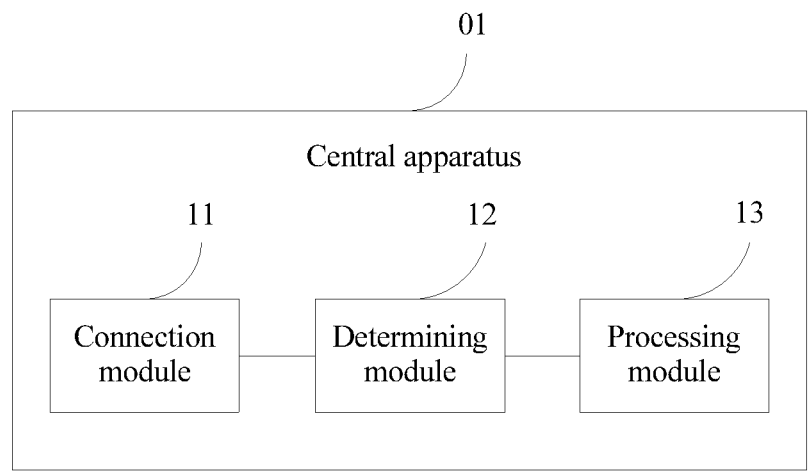
FIG. 5 is a schematic structural diagram of Embodiment 1 of a central apparatus according to the present disclosure.

FIG. 5 is a schematic structural diagram of Embodiment 1 of a central apparatus according to the present disclosure. As shown in FIG. 5, the central apparatus 01 in this embodiment may include a connection module 11, a determining module 12, and a processing module 13. The connection module 11 is configured to establish communication connections to at least two wearable electronic devices. The determining module 12 is configured to determine whether the at least two wearable electronic devices support a same function. The processing module 13 is configured to obtain device information of the wearable electronic devices that support the same function if the at least two wearable electronic devices support a same function, determine, according to the device information, at least one of the wearable electronic devices that support the same function as a target wearable electronic device, and disable a service that is corresponding to the same function and that is on the target wearable electronic device.

The central apparatus in this embodiment may be configured to execute the technical solutions in the method embodiment shown in FIG. 1. Implementation principles and technical effects thereof are similar, and details are not described herein.

Figure 6:
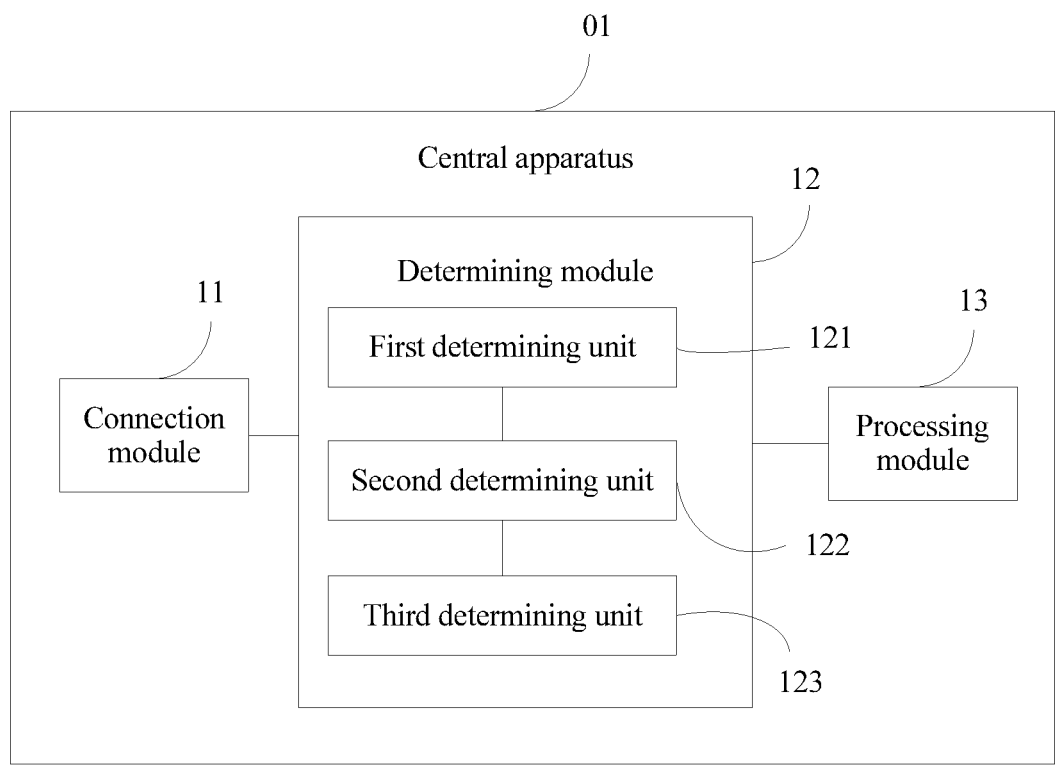
FIG. 6 is a schematic structural diagram of Embodiment 2 of a central apparatus according to the present disclosure.

FIG. 6 is a schematic structural diagram of Embodiment 2 of a central apparatus according to the present disclosure. As shown in FIG. 6, on the basis of a structure of the central device shown in FIG. 5, in a central apparatus 01 in this embodiment, further, the determining module 12 may include a first determining unit 121, a second determining unit 122, and a third determining unit 123. The first determining unit 121 is configured to obtain service lists of the at least two wearable electronic devices, and determine, according to the service lists, whether the at least two wearable electronic devices support a same service. The second determining unit 122 is configured to obtain characteristic lists that are of the wearable electronic devices that support the same service and that are corresponding to the same service if the at least two wearable electronic devices support a same service, and determine, according to the characteristic lists, whether characteristics of the same services supported by the wearable electronic devices that support the same service are the same. The third determining unit 123 is configured to determine that the wearable electronic devices that support the same service support the same function if the characteristics are the same.

When the device information includes only a device identification, the processing module 13 is configured to set a carry-on wearable electronic device as the target wearable electronic device if it is determined, according to device identifications, that the wearable electronic devices that support the same function include the carry-on wearable electronic device and a non-carry-on wearable electronic device.

When the device information includes a device identification and a current battery, and further includes at least one of a power consumption speed or a sensor model, the processing module 13 is configured to obtain, according to characteristic values corresponding to the device information of each of the wearable electronic devices that support the same function and according to a weight of each type of device information, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function.

When the device information includes a device identification, a current battery, and a power consumption speed, the processing module 13 is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery and the power consumption speed that are of each of the wearable devices that support the same function, a correspondence between the current battery and a characteristic value, a correspondence between the power consumption speed and a characteristic value, a weight of the power consumption speed, and a weight of the current battery, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the power consumption speed is higher than the weight of the current battery when the current batteries of the wearable electronic devices that support the same function are all greater than a first threshold, or the weight of the current battery is higher than the power consumption speed when at least one of the current batteries of the wearable electronic devices that support the same function is less than a first threshold.

When the device information includes a device identification, a current battery, and a sensor model, the processing module 13 is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery and the sensor model that are of each of the wearable devices that support the same function, a correspondence between the current battery and a characteristic value, a correspondence between the sensor model and a characteristic value, a weight of the power consumption speed, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than the weight of the current battery when the current batteries of the wearable electronic devices that support the same function are all greater than a second threshold, or the weight of the current battery is higher than the weight of the sensor when at least one of the current batteries of the wearable electronic devices that support the same function is less than a second threshold.

When the device information includes a device identification, a current battery, a power consumption speed, and a sensor model, the processing module 13 is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery, the power consumption speed, and the sensor model that are of each of the wearable devices that support the same function, a correspondence between the current battery and a characteristic value, a correspondence between the power consumption speed and a characteristic value, a correspondence between the sensor model and a characteristic value, a weight of the power consumption speed, a weight of the current battery, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than both the weight of the current battery and the weight of the power consumption speed when the current batteries of the wearable electronic devices that support the same function are all greater than a third threshold, or the weight of the power consumption speed is higher than both the weight of the current battery and the weight of the sensor model when the current batteries of the wearable electronic devices that support the same function are all greater than a fourth threshold and at least one of the current batteries is less than the third threshold, and the fourth threshold is less than the third threshold, or the weight of the current battery is higher than both the weight of the power consumption speed and the weight of the sensor model when at least one of the current batteries of the wearable electronic devices that support the same function is less than the fourth threshold.

The central apparatus in this embodiment may be configured to execute the technical solutions in the method embodiment shown in FIG. 2. Implementation principles and technical effects thereof are similar, and details are not described herein.

Figure 7:
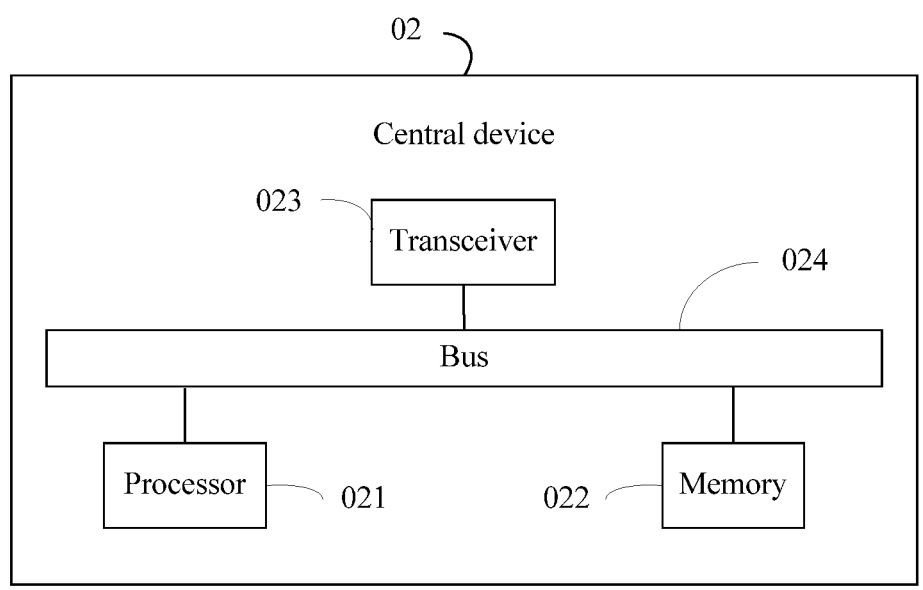
FIG. 7 is a schematic structural diagram of an embodiment of a central device according to the present disclosure.

FIG. 7 is a schematic structural diagram of an embodiment of a central device according to the present disclosure. As shown in FIG. 7, the central device 02 includes a bus 024, and a processor 021, a memory 022, and a transceiver 023 that are connected to the bus 024.

The transceiver 023 is configured to establish communication connections to at least two wearable electronic devices.

The processor 021 is configured to determine whether the at least two wearable electronic devices support a same function after the transceiver 023 establishes the communication connections, and obtain device information of the wearable electronic devices that support the same function if the at least two wearable electronic devices support a same function, and determine, according to the device information, at least one of the wearable electronic devices that support the same function as a target wearable electronic device.

The transceiver 023 is further configured to send a disable instruction to the target wearable electronic device, to disable a service that is corresponding to the same function and that is on the target wearable electronic device.

The processor 021 is further configured to obtain service lists supported by the at least two wearable electronic devices, and determine, according to the service lists, whether the at least two wearable electronic devices support a same service, obtain characteristic lists that are of the wearable electronic devices that support the same service and that are corresponding to the same service if the at least two wearable electronic devices support a same service, and determine, according to the characteristic lists, whether characteristics of the same services supported by the wearable electronic devices that support the same service are the same, and determine that the wearable electronic devices that support the same service support the same function if the characteristics are the same.

When the device information includes only a device identification, the processor 021 is configured to set a carry-on wearable electronic device as the target wearable electronic device if it is determined, according to device identifications, that the wearable electronic devices that support the same function include the carry-on wearable electronic device and a non-carry-on wearable electronic device.

When the device information includes a device identification and a current battery, and further includes at least one of a power consumption speed or a sensor model, the processor 021 is configured to obtain, according to characteristic values corresponding to the device information of each of the wearable electronic devices that support the same function and according to a weight of each type of device information, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function.

When the device information includes a device identification, a current battery, and a power consumption speed, the processor 021 is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery and the power consumption speed that are of each of the wearable devices that support the same function, a correspondence between the current battery and a characteristic value, a correspondence between the power consumption speed and a characteristic value, a weight of the power consumption speed, and a weight of the current battery, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the power consumption speed is higher than the weight of the current battery when the current batteries of the wearable electronic devices that support the same function are all greater than a first threshold, or the weight of the current battery is higher than the power consumption speed when at least one of the current batteries of the wearable electronic devices that support the same function is less than a first threshold.

When the device information includes a device identification, a current battery, and a sensor model, the processor 021 is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery and the sensor model that are of each of the wearable devices that support the same function, a correspondence between the current battery and a characteristic value, a correspondence between the sensor model and a characteristic value, a weight of the power consumption speed, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than the weight of the current battery when the current batteries of the wearable electronic devices that support the same function are all greater than a second threshold, or the weight of the current battery is higher than the weight of the sensor when at least one of the current batteries of the wearable electronic devices that support the same function is less than a second threshold.

When the device information includes a device identification, a current battery, a power consumption speed, and a sensor model, the processor 021 is configured to set a carry-on wearable electronic device as the target wearable electronic device if it is determined, according to device identifications, that the wearable electronic devices that support the same function include the carry-on wearable electronic device and a non-carry-on wearable electronic device, or if it is determined, according to device identifications, that the wearable electronic devices that support the same function are all carry-on wearable electronic devices or are all non-carry-on wearable electronic devices, obtain, according to the current battery, the power consumption speed, and the sensor model that are of each of the wearable devices that support the same function, a correspondence between the current battery and a characteristic value, a correspondence between the power consumption speed and a characteristic value, a correspondence between the sensor model and a characteristic value, a weight of the power consumption speed, a weight of the current battery, and a weight of the sensor model, a weighted characteristic value corresponding to each of the wearable electronic devices that support the same function, and determine, according to the weighted characteristic value corresponding to each of the wearable electronic devices that support the same function, the target wearable electronic device from the wearable electronic devices that support the same function, where the weight of the sensor model is higher than both the weight of the current battery and the weight of the power consumption speed when the current batteries of the wearable electronic devices that support the same function are all greater than a third threshold, or the weight of the power consumption speed is higher than both the weight of the current battery and the weight of the sensor model when the current batteries of the wearable electronic devices that support the same function are all greater than a fourth threshold and at least one of the current batteries is less than the third threshold, and the fourth threshold is less than the third threshold, or the weight of the current battery is higher than both the weight of the power consumption speed and the weight of the sensor model when at least one of the current batteries of the wearable electronic devices that support the same function is less than the fourth threshold.

The central device in this embodiment may be configured to execute the technical solutions in the foregoing method embodiments. Implementation principles and technical effects thereof are similar, and details are not described herein.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The integrated unit may be stored in a computer-readable storage medium when the foregoing integrated unit is implemented in a form of a software functional unit. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or a part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for controlling wearable electronic devices, wherein the method is executed by a central device and comprises:

determining whether at least two wearable electronic devices support a same function after establishing communication connections to the at least two wearable electronic devices;

obtaining device information of the wearable electronic devices that support the same function when the at least two wearable electronic devices support the same function, wherein the device information comprises a device identification, a current battery, and at least one of a power consumption speed or a sensor model;

determining, according to the device information, at least one of the wearable electronic devices that support the same function as a target wearable electronic device by:

obtaining, according to characteristic values corresponding to the device information of each of the wearable electronic devices that support the same function and according to a weight of each type of device information, a weighted characteristic value corresponding to each of the wearable electronic devices that support the same function; and determining, according to the weighted characteristic value corresponding to each of the wearable electronic devices that support the same function, the target wearable electronic device from the wearable electronic devices that support the same function; and disabling a service that is corresponding to the same function and that is on the target wearable electronic device.

2. The method according to claim 1, wherein determining whether the at least two wearable electronic devices support the same function comprises:

obtaining service lists of the at least two wearable electronic devices;

determining, according to the service lists, whether the at least two wearable electronic devices support a same service;

obtaining characteristic lists that are of the wearable electronic devices that support the same service and that are corresponding to the same service when the at least two wearable electronic devices support the same service;

determining, according to the characteristic lists, whether characteristics of the same services supported by the wearable electronic devices that support the same service are the same; and determining that the wearable electronic devices that support the same service support the same function when the characteristics are the same.

3. The method according to claim 1, wherein determining at least one of the wearable electronic devices that support the same function as the target wearable electronic device comprises setting a carry-on wearable electronic device as the target wearable electronic device when the wearable electronic devices that support the same function comprise the carry-on wearable electronic device and a non-carry-on wearable electronic device according to device identifications.

4. The method according to claim 1, wherein the device information comprises the power consumption speed, and wherein determining at least one of the wearable electronic devices that support the same function as the target wearable electronic device further comprises:

setting a carry-on wearable electronic device as the target wearable electronic device when the wearable electronic devices that support the same function comprise the carry-on wearable electronic device and a non-carry-on wearable electronic device according to device identifications; and obtaining, according to the current battery and the power consumption speed that are of each of the wearable electronic devices that support the same function, a correspondence between the current battery and a characteristic value, a correspondence between the power consumption speed and the characteristic value, a weight of the power consumption speed, and a weight of the current battery, the weighted characteristic value corresponding to each of the wearable electronic devices that support the same function when the wearable electronic devices that support the same function are all carry-on wearable electronic devices or are all non-carry-on wearable electronic devices according to device identifications, wherein the weight of the power consumption speed is higher than the weight of the current battery when the current batteries of the wearable electronic devices that support the same function are all greater than a first threshold, and wherein the weight of the current battery is higher than the weight of the power consumption speed when at least one of the current batteries of the wearable electronic devices that support the same function is less than the first threshold.

5. The method according to claim 1, wherein the device information comprises the sensor model, and wherein determining at least one of the wearable electronic devices that support the same function as the target wearable electronic device further comprises:

setting a carry-on wearable electronic device as the target wearable electronic device when the wearable electronic devices that support the same function comprise the carry-on wearable electronic device and a non-carry-on wearable electronic device according to device identifications; and obtaining, according to the current battery and the sensor model that are of each of the wearable electronic devices that support the same function, a correspondence between the current battery and a characteristic value, a correspondence between the sensor model and the characteristic value, a weight of a current electricity quantity, and a weight of the sensor model, the weighted characteristic value corresponding to each of the wearable electronic devices that support the same function when the wearable electronic devices that support the same function are all carry-on wearable electronic devices or are all non-carry-on wearable electronic devices according to device identifications, wherein the weight of the sensor model is higher than the weight of the current battery when the current batteries of the wearable electronic devices that support the same function are all greater than a second threshold, and wherein the weight of the current battery is higher than the weight of the sensor model when at least one of the current batteries of the wearable electronic devices that support the same function is less than the second threshold.

6. The method according to claim 1, wherein determining at least one of the wearable electronic devices that support the same function as the target wearable electronic device further comprises:

setting a carry-on wearable electronic device as the target wearable electronic device when the wearable electronic devices that support the same function comprise the carry-on wearable electronic device and a non-carry-on wearable electronic device according to device identifications; and obtaining, according to the current battery, the power consumption speed, and the sensor model that are of each of the wearable electronic devices that support the same function, a correspondence between the current battery and a characteristic value, a correspondence between the power consumption speed and the characteristic value, a correspondence between the sensor model and a characteristic value, a weight of the power consumption speed, a weight of the current battery, and a weight of the sensor model, the weighted characteristic value corresponding to each of the wearable electronic devices that support the same function when the wearable electronic devices that support the same function are all carry-on wearable electronic devices or are all non-carry-on wearable electronic devices according to device identifications, wherein the weight of the sensor model is higher than both the weight of the current battery and the weight of the power consumption speed when the current batteries of the wearable electronic devices that support the same function are all greater than a third threshold, wherein the weight of the power consumption speed is higher than both the weight of the current battery and the weight of the sensor model when the current batteries of the wearable electronic devices that support the same function are all greater than a fourth threshold and at least one of the current batteries is less than the third threshold, wherein the fourth threshold is less than the third threshold, and wherein the weight of the current battery is higher than both the weight of the power consumption speed and the weight of the sensor model when at least one of the current batteries of the wearable electronic devices that support the same function is less than the fourth threshold.

7. A central device, comprising;
a transceiver configured to establish communication connections to at least two wearable electronic devices; and a processor coupled to the transceiver and configured to:
  determine whether the at least two wearable electronic devices support a same function after the transceiver establishes the communication connections;
  obtain device information of the wearable electronic devices that support the same function when the at least two wearable electronic devices support the same function, wherein the device information comprises a device identification, a current battery, and at least one of a power consumption speed or a sensor model;
  determine, according to the device information, at least one of the wearable electronic devices that support the same function as a target wearable electronic device;
  obtain, according to characteristic values corresponding to the device information of each of the wearable electronic devices that support the same function and according to a weight of each type of device information, a weighted characteristic value corresponding to each of the wearable electronic devices that support the same function; and
  determine, according to the weighted characteristic value corresponding to each of the wearable electronic devices that support the same function, the target wearable electronic device from the wearable electronic devices that support the same function,
  wherein the transceiver is further configured to send a disable instruction to the target wearable electronic device, to disable a service that is corresponding to the same function and that is on the target wearable electronic device.

8. The central device according to claim 7, wherein the processor is further configured to:
  obtain service lists supported by the at least two wearable electronic devices;
  determine, according to the service lists, whether the at least two wearable electronic devices support a same service;
  obtain characteristic lists that are of the wearable electronic devices that support the same service and that are corresponding to the same service when the at least two wearable electronic devices support the same service;
  determine, according to the characteristic lists, whether characteristics of the same services supported by the wearable electronic devices that support the same service are the same; and
  determine that the wearable electronic devices that support the same service support the same function when the characteristics are the same.

9. The central device according to claim 7, wherein the processor is further configured to set a carry-on wearable electronic device as the target wearable electronic device when the wearable electronic devices that support the same function comprise the carry-on wearable electronic device and a non-carry-on wearable electronic device according to device identifications.

10. The central device according to claim 7, wherein the device information comprises the power consumption speed, and wherein the processor is further configured to:
  set a carry-on wearable electronic device as the target wearable electronic device when the wearable electronic devices that support the same function comprise the carry-on wearable electronic device and a non-carry-on wearable electronic device according to device identifications; and
  obtain, according to the current battery and the power consumption speed that are of each of the wearable electronic devices that support the same function, a correspondence between the current battery and a characteristic value, a correspondence between the power consumption speed and the characteristic value, a weight of the power consumption speed, and a weight of the current battery, the weighted characteristic value corresponding to each of the wearable electronic devices that support the same function according to device identifications when the wearable electronic devices that support the same function are all carry-on wearable electronic devices or are all non-carry-on wearable electronic devices,
  wherein the weight of the power consumption speed is higher than the weight of the current battery when the current batteries of the wearable electronic devices that support the same function are all greater than a first threshold, and
  wherein the weight of the current battery is higher than the weight of the power consumption speed when at least one of the current batteries of the wearable electronic devices that support the same function is less than the first threshold.

11. The central device according to claim 7, wherein the device information comprises the sensor model, and wherein the processor is further configured to:
  set a carry-on wearable electronic device as the target wearable electronic device when the wearable electronic devices that support the same function comprise the carry-on wearable electronic device and a non-carry-on wearable electronic device according to device identifications; and
  obtain, according to the current battery and the sensor model that are of each of the wearable electronic devices that support the same function, a correspondence between the current battery and a characteristic value, a correspondence between the sensor model and the characteristic value, a weight of a current electricity quantity, and a weight of the sensor model, the weighted characteristic value corresponding to each of the wearable electronic devices that support the same function when the wearable electronic devices that support the same function are all carry-on wearable electronic devices or are all non-carry-on wearable electronic devices according to device identifications,
  wherein the weight of the sensor model is higher than the weight of the current battery when the current batteries of the wearable electronic devices that support the same function are all greater than a second threshold, and
  wherein the weight of the current battery is higher than the weight of the sensor model when at least one of the current batteries of the wearable electronic devices that support the same function is less than the second threshold.

12. The central device according to claim 7, wherein the device information comprises the power consumption speed and the sensor model, and wherein the processor is further configured to:
  set a carry-on wearable electronic device as the target wearable electronic device when the wearable electronic devices that support the same function comprise the carry-on wearable electronic device and a non-carry-on wearable electronic device according to device identifications;
  obtain, according to the current battery, the power consumption speed, and the sensor model that are of each of the wearable electronic devices that support the same function, a correspondence between the current battery and a characteristic value, a correspondence between the power consumption speed and the characteristic value, a correspondence between the sensor model and a characteristic value, a weight of the power consumption speed, a weight of the current battery, and a weight of the sensor model, the weighted characteristic value corresponding to each of the wearable electronic devices that support the same function when the wearable electronic devices that support the same function are all carry-on wearable electronic devices or are all non-carry-on wearable electronic devices according to device identifications, wherein the weight of the sensor model is higher than both the weight of the current battery and the weight of the power consumption speed when the current batteries of the wearable electronic devices that support the same function are all greater than a third threshold, wherein the weight of the power consumption speed is higher than both the weight of the current battery and the weight of the sensor model when the current batteries of the wearable electronic devices that support the same function are all greater than a fourth threshold and at least one of the current batteries is less than the third threshold, wherein the fourth threshold is less than the third threshold, and wherein the weight of the current battery is higher than both the weight of the power consumption speed and the weight of the sensor model when at least one of the current batteries of the wearable electronic devices that support the same function is less than the fourth threshold.

13. A method for controlling wearable electronic devices, wherein the method is executed by a central device and comprises:

determining whether at least two wearable electronic devices support a same function after establishing communication connections to the at least two wearable electronic devices;

obtaining device information of the wearable electronic devices that support the same function when the at least two wearable electronic devices support the same function, wherein the device information comprises a device identification, a current battery, a power consumption speed, and a sensor model;

determining, according to the device information, at least one of the wearable electronic devices that support the same function as a target wearable electronic device by:

setting a carry-on wearable electronic device as the target wearable electronic device when the wearable electronic devices that support the same function comprise the carry-on wearable electronic device and a non-carry-on wearable electronic device according to device identifications;

obtaining, according to the current battery, the power consumption speed, and the sensor model that are of each of the wearable devices that support the same function, a correspondence between the current battery and a characteristic value, a correspondence between the power consumption speed and the characteristic value, a correspondence between the sensor model and a characteristic value, a weight of the power consumption speed, a weight of the current battery, and a weight of the sensor model, a weighted characteristic value corresponding to each of the wearable electronic devices that support the same function when the wearable electronic devices that support the same function are all carry-on wearable electronic devices or are all non-carry-on wearable electronic devices according to device identifications; and determining, according to the weighted characteristic value corresponding to each of the wearable electronic devices that support the same function, the target wearable electronic device from the wearable electronic devices that support the same function, wherein the weight of the sensor model is higher than both the weight of the current battery and the weight of the power consumption speed when the current batteries of the wearable electronic devices that support the same function are all greater than a third threshold, wherein the weight of the power consumption speed is higher than both the weight of the current battery and the weight of the sensor model when the current batteries of the wearable electronic devices that support the same function are all greater than a fourth threshold and at least one of the current batteries is less than the third threshold, wherein the fourth threshold is less than the third threshold, and wherein the weight of the current battery is higher than both the weight of the power consumption speed and the weight of the sensor model when at least one of the current batteries of the wearable electronic devices that support the same function is less than the fourth threshold; and disabling a service that is corresponding to the same function and that is on the target wearable electronic device.

* * * * *